United States Patent
Arora et al.

(10) Patent No.: US 12,400,031 B2
(45) Date of Patent: Aug. 26, 2025

(54) SYSTEM AND METHOD FOR SECURE AND ROBUST DISTRIBUTED DEEP LEARNING

(71) Applicant: The Trustees of Princeton University, Princeton, NJ (US)

(72) Inventors: Sanjeev Arora, Princeton, NJ (US); Kai Li, Princeton, NJ (US); Yangsibo Huang, Princeton, NJ (US); Zhao Song, Princeton, NJ (US); Danqi Chen, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 304 days.

(21) Appl. No.: 18/009,765

(22) PCT Filed: Jun. 17, 2021

(86) PCT No.: PCT/US2021/037813
§ 371 (c)(1),
(2) Date: Dec. 12, 2022

(87) PCT Pub. No.: WO2021/257817
PCT Pub. Date: Dec. 23, 2021

(65) Prior Publication Data
US 2023/0289473 A1 Sep. 14, 2023

Related U.S. Application Data

(60) Provisional application No. 63/110,005, filed on Nov. 5, 2020, provisional application No. 63/040,300, filed on Jun. 17, 2020.

(51) Int. Cl.
*G06F 21/62* (2013.01)
*G06F 21/60* (2013.01)
*G06N 3/098* (2023.01)

(52) U.S. Cl.
CPC ........ *G06F 21/6254* (2013.01); *G06F 21/602* (2013.01); *G06N 3/098* (2023.01)

(58) Field of Classification Search
CPC ... G06F 21/6254; G06F 21/602; G06N 3/098; G06N 3/045; G06N 3/084; G09C 5/00
See application file for complete search history.

(56) References Cited

U.S. PATENT DOCUMENTS 5,159,453 A * 10/1992 Dhein .................... H04N 7/015
348/E7.039
6,603,576 B1 * 8/2003 Nakamura ......... H04N 1/32208
358/3.22

(Continued)

OTHER PUBLICATIONS

Abadi, Martin et al., "On Hiding Information from an Oracle", Journal of Computer and System Sciences, vol. 39, pp. 21-50, 1989.

(Continued)

*Primary Examiner* — Huan V Doan
(74) *Attorney, Agent, or Firm* — MEAGHER EMANUEL LAKS GOLDBERG & LIAO, LLP

(57) ABSTRACT

According to various embodiments, a method for encrypting image data for a neural network are disclosed. The method includes mixing the image data with other datapoints to form mixed data; and applying a pixel-wise random mask to the mixed data to form encrypted data. According to various embodiments, a method for encrypting text data for a neural network for natural language processing is disclosed. The method includes encoding each text datapoint via a pre-trained text encoder to form encoded datapoints; mixing the encoded datapoints with other encoded datapoints to form mixed data; applying a random mask to the mixed data to form encrypted data; and incorporating the encrypted data into training a classifier of the neural network and fine-tuning the text encoder.

16 Claims, 24 Drawing Sheets

---

Algorithm 1 $(m,k)$ - TextHide

1: procedure TEXTHIDE$(E, M, k)$
2:                   ▷ $E$: the training batch, $b$: $|E| = b$
3:                   ▷ $M$: the mask pool, $m$: $|M| = m$
4:                   ▷ $k$: number of training examples to be mixed
5:                   ▷ Let $[b]$ denote the set $\{1, 2, ..., b\}$
6:     $\tilde{E} \leftarrow \emptyset$
7:     Generate $\pi_1$ such that $\pi_1(i) = i, \forall i \in [b]$
8:     Generate $k - 1$ random permutations $\pi_2, ..., \pi_k: [b] \rightarrow [b]$
9:     Sample $\lambda_1, ..., \lambda_b \sim |N(0, I_k)| \in \mathbb{R}^k$ uniformly at random,
       normalize s.t. $\Sigma_{j=1}^{k}(\lambda_i)_j = 1, \forall i \in [b]$.
10:    for $(e_i, y_i) \in E$ do
11:        $\sigma_i \sim M$
12:        $\tilde{e}_i \leftarrow \sigma_i \circ \Sigma_{j=1}^{k}(\lambda_i)_j \cdot e_{\pi_j(i)}$
13:        $\tilde{y}_i \leftarrow \Sigma_{j=1}^{k}(\lambda_i)_j \cdot y_{\pi_j(i)}$
14:        $\tilde{E} \leftarrow \tilde{E} \cup \{(\tilde{x}_i, \tilde{y}_i)\}$
15:    end for
16:    return $\tilde{E}$
17: end procedure

(56) References Cited

U.S. PATENT DOCUMENTS

| | | | |
|---|---|---|---|
| 10,269,155 B1* | 4/2019 | Brailovskiy | H04N 23/698 |
| 10,540,757 B1* | 1/2020 | Bouhnik | G06T 3/14 |
| 2005/0278402 A1 | 12/2005 | Ishikawa | |
| 2006/0107070 A1 | 5/2006 | Rice et al. | |
| 2007/0098166 A1 | 5/2007 | Candelore et al. | |
| 2008/0037780 A1 | 2/2008 | Layton | |
| 2010/0067706 A1 | 3/2010 | Anan et al. | |
| 2019/0236394 A1* | 8/2019 | Price | G06V 10/945 |
| 2021/0309248 A1* | 10/2021 | Choe | G06N 3/04 |
| 2021/0350555 A1* | 11/2021 | Fischetti | G06T 7/73 |
| 2022/0415004 A1* | 12/2022 | Netsch | G06V 10/758 |

OTHER PUBLICATIONS

Abadi, Martin et al., "Deep Learning with Differential Privacy", Proceedings of the 2016 ACM SIGSAC Conference on Computer and Communications Security, pp. 308-318, 2016.

Abboud, Amir and Lewi, Kevin, "Exact Weight Subgraphs and the k-Sum Conjecture", International Colloquium on Automata, Languages, and Programming (ICALP), 2013.

Abboud, Amir et al., "Losing Weight by Gaining Edges", European Symposium on Algorithms (ESA), 2014.

Abboud, Amir, "Fine-Grained Reductions and Quantum Speedups for Dynamic Programming", 46th International Colloquium on Automata, Languages, and Programming (ICALP), 2019.

Alzantot, Moustafa et al., "Generating Natural Language Adversarial Examples", arXiv: 1804.07998v2, Sep. 24, 2018.

Papernot, Nicolas et al., "Making the Shoe Fit: Architectures, Initializations, and Tuning or Learning with Privacy", ICLR 2020 Conference Blind Submission, Sep. 25, 2019.

Athalye, Anish et al., "Obfuscated Gradients Give a False Sense of Security: Circumventing Defenses to Adversarial Examples", Proceedings of the 35th International Conference on Machine Learning, 2018.

Baran, Ilya et al., "Subquadratic Algorithms for 3SUM", Algorithmica, vol. 50, No. 4, pp. 584-596, 2008.

Beckham, Christopher et al., "On Adversarial Mixup Resynthesis", NEURIPS, Oct. 2019.

Beimel, Amos, "Secret-Sharing Schemes: A Survey", International Conference on Coding and Cryptology, pp. 11-46, Springer, 2011.

Berthelot, David et al., "MixMatch: A Holistic Approach to Semi-Supervised Learning", NeurIPS, Oct. 2019.

Bhattacharyya, Arnab et al., "The Complexity of Linear Dependence Problems in Vector Spaces", ICS, pp. 496-508, 2011.

Biggio, Battista et al., "Evasion attacks against machine learning at test time", Joint European Conference on Machine Learning and Knowledge Discovery in Databases, pp. 387-402, Springer, 2013.

Bonawitz, Keith et al., "Practical Secure Aggregation for Federated Learning on User-Held Data", NIPS Workshop on Private Multi-Party Machine Learning, 2016.

Carlini, Nicholas et al., "Adversarial Examples Are Not Easily Detected: Bypassing Ten Detection Methods", Proceedings of the 10th ACM Workshop on Artificial Intelligence and Security, pp. 3-14, 2017.

Carmon, Yair et al., "Unlabeled Data Improves Adversarial Robustness", Advances in Neural Information Processing Systems, pp. 11190-11201, 2019.

Chernoff, Herman, "A Measure of Asymptotic Efficiency for Tests of a Hypothesis Based on the Sum of Observations", The Annals of Mathematical Statistics, pp. 493-507, 1952.

Dhillon, Guneet S. et al., "Stochastic Activation Pruning for Robust Adversarial Defense", arXiv:1803.01442v1, Mar. 5, 2018.

Dolev, Shlomi et al., "Privacy-Preserving Secret Shared Computations using MapReduce", IEEE Transactions on Dependable and Secure Computing, 2019.

Dosovitskiy, Alexey and Brox, Thomas, "Inverting Visual Representations with Convolutional Networks", CVPR, pp. 4829-4837, 2016.

Dwork, Cynthia, "The Differential Privacy Frontier (Extended Abstract)", Theory of Cryptography Conference, pp. 496-503, Spring, 2006.

Wikipedia contributors, "Random oracle", Wikipedia, https://en.wikipedia.org/wiki/Random_oracle, accessed Jul. 20, 2023.

Dwork, Cynthia et al., "Our Data, Ourselves: Privacy via Distributed Noise Generation", Annual International Conference on the Theory and Applications of Cryptographic Techniques, pp. 486-503, Springer, 2006.

Erickson, Jeff, "Lower Bounds for Linear Satisfiability Problems", SODA, pp. 388-395, 1995.

Foss, Sergey et al., "An Introduction to Heavy-Tailed and Subexponential Distributions", Oberwolfach Preprints, Apr. 30, 2009.

Fredrikson, Matt et al., "Model Inversion Attacks that Exploit Confidence Information and Basic Countermeasures", Proceedings of the 22nd ACM SIGSAC Conference on Computer and Communications Security, pp. 1322-1333, 2015.

Fu, Yingwei et al., "Mixup Based Privacy Preserving Mixed Collaboration Learning", 2019 IEEE International Conference on Service-Oriented System Engineering (SOSE), pp. 275-2755, 2019.

Gentry, Craig, "Fully Homomorphic Encryption Using Ideal Lattices", Proceedings of the Forty-First Annual ACM Symposium on Theory of Computing (STOC), pp. 169-178, 2009.

Goodfellow, Ian J. et al., "Explaining and Harnessing Adversarial Examples", arXiv:1412.6572v3, Mar. 20, 2015.

Graepel, Thore et al., "ML Confidential: Machine Learning on Encrypted Data", International Conference on Information Security and Cryptology, pp. 1-21, Springer, 2012.

Guo, Chuan et al., "Countering Adversarial Images Using Input Transformations", arXiv:1711.00117v3, Jan. 25, 2018.

Haagerup, Uffe, "The best constants in the Khintchine inequality", Studia Mathematica, vol. 70, No. 3, pp. 231-283, 1981.

He, Kaiming et al., "Deep Residual Learning for Image Recognition", CVPR, pp. 770-778, 2016.

Hitaj, Briland et al., "Deep Residual Learning for Image Recognition", Proceedings of the 2017 ACM SIGSAC Conference on Computer and Communications Security, pp. 603-618, 2017.

Hoeffding, Wassily, "Probability Inequalities for Sums of Bounded Random Variables", Journal of the American Statistical Association, vol. 58, No. 301, pp. 13-30, 1963.

Huang, Yangsibo et al., "InstaHide: Instance-hiding Schemes for Private Distributed Learning", International Conference on Machine Learning, 2020.

Impagliazzo, Russell and Paturi, Ramamohan, "Which Problems Have Strongly Exponential Complexity?", Journal of Computer and System Sciences, vol. 63, pp. 512-530, 2001.

Verma, Vikas et al., "Manifold Mixup: Better Representations by Interpolating Hidden States", ICML, pp. 6438-6447, 2019.

Woodruff, David P., "Sketching as a Tool for Numerical Linear Algebra", Foundations and Trends in Theoretical Computer Science, vol. 10, Nos. 1-2, pp. 1-157, Feb. 11, 2015.

Wright, Farroll T., "A Bound on Tail Probabilities for Quadratic Forms in Independent Random Variables Whose Distributions are not Necessarily Symmetric", The Annals of Probability, vol. 1, No. 6, pp. 1068-1070, Dec. 1973.

Xie, Cihang et al., "Mitigating Adversarial Effects Through Randomization", ICLR, arXiv:1711.01991v3, Feb. 28, 2018.

Yang, Yuzhe et al., "ME-Net: Towards Effective Adversarial Robustness with Matrix Estimation", ICML, arXiv:1905.11971v1, May 28, 2019.

Yao, Andrew C., "Protocols for Secure Computations", 23rd Annual Symposium on Foundations of Computer Science (SFCS 1982), pp. 160-164, Nov. 1982.

Zhang, Hongyi et al., "Mixup: Beyond Empirical Risk Minimization", ICLR, arXiv:1710.09412v2, Apr. 27, 2018.

Zhu, Ligeng et al., "Deep Leakage from Gradients", NeurIPS, arXiv:1906.08935v2, Dec. 19, 2019.

California State Legislature, "California Consumer Privacy Act (CPPA)", https://oag.ca.gov/privacy/ccpa, 2018.

Tramer, Florian et al., "Ensemble Adversarial Training: Attacks and Defenses", ICLR, arXiv:1705.07204v5, Apr. 26, 2020.

Deng, Jia et al., "ImageNet: A Large-Scale Hierarchical Image Database", CVPR, pp. 248-2555, IEEE, 2009.

(56) References Cited

OTHER PUBLICATIONS

Tropp, Joel A., "An introduction to matrix concentration inequalities", Foundations and Trends in Machine Learning, vol. 8, Nos. 1-2, pp. 1-230, 2015.
Dwork, Cynthia and Roth, Aaron, "The Algorithmic Foundations of Differential Privacy", Foundations and Trends in Theoretical Computer Science, vol. 9, Nos. 3-4, pp. 211-407, 2014.
Mao, Xiao-Jiao et al., "Image Restoration Using Very Deep Convolutional Encoder-Decoder Networks with Symmetric Skip Connections", NIPS, pp. 2802-2810, 2016.
Jiang, Shunhua et al., "Faster Dynamic Matrix Inverse for Faster LPs", arXiv 2004:07470v1, Apr. 16, 2020.
The European Parliament and the Council of the European Union, "Regulation (EU) 2016/679 . . . on the protection of natural persons with regard to the processing of personal data and on the free movement of such data, and repealing Directive 95/46/EC (General Data Protection Regulation)", Official Journal of the European Union, May 4, 2016.
Karp, Richard M., "Reducibility Among Combinatorial Problems", Complexity of Computer Computations, pp. 85-103, Plenum Press, 1972.
Kermany, Daniel S. et al., "Identifying Medical Diagnoses and Treatable Diseases by Image-Based Deep Learning", Cell, vol. 172, pp. 1122-1131, Feb. 22, 2018.
Kingma, Diederik P. and BA, Jimmy Lei, "ADAM: A Method for Stochastic Optimization", ICLR, arXiv:1412.6980v9, Jan. 30, 2017.
Konecny, Jakub et al., "Federated Learning: Strategies for Improving Communication Efficiency", NIPS Workshop on Private Multi-Party Machine Learning, arXiv:1610.05492v2, Oct. 30, 2017.
Krizhevsky, Alex, "Learning Multiple Layers of Features from Tiny Images", technical report, Citeseer, Apr. 8, 2009.
Lamb, Alex et al., "Interpolated Adversarial Training: Achieving robust neural networks without sacrificing too much accuracy", Neural Networks, vol. 154, pp. 218-233, Jul. 16, 2022.
Laurent, B. and Massart, P., "Adaptive Estimation of a Quadratic Functional by Model Selection", The Annals of Statistics, vol. 28, No. 5, pp. 1302-1338, 2000.
Lee, Yin Tat et al., "Solving Empirical Risk Minimization in the Current Matrix Multiplication Time", COLT, arXiv:1905.04447v1, May 11, 2019.
Li, Ping et al., "Multi-key privacy-preserving deep learning in cloud computing", Future Generation Computer Systems, vol. 74, pp. 76-85, 2017.
Liu, Zhijian et al., "FaceMix: Privacy-Preserving Face Attribute Classification on the Cloud", Han Lab Tech report, 2019.
Lu, Yichao et al., "Faster Ridge Regression via the Subsampled Randomized Hadamard Transform", Advances in Neural Information Processing Systems, pp. 369-377, 2013.
Madry, Aleksander et al., "Towards Deep Learning Models Resistant to Adversarial Attacks", ICLR, arXiv:1706.06083v4, Sep. 4, 2019.
Mohassel, Payman and Zhang, Yupeng, "SecureML: A System for Scalable Privacy-Preserving Machine Learning", 2017 IEEE Symposium on Security and Privacy (SP), pp. 19-38, 2017.
Pang, Tianyu et al., "Mixup Inference: Better Exploiting Mixup to Defend Adversarial Attacks", ICLR, arXiv:1909.11515v2, Feb. 20, 2020.
Papernot, Nicolas et al., "Practical Black-Box Attacks against Machine Learning", Proceedings of the 2017 ACM on Asia Conference on Computer and Communications Security, pp. 506-519, 2017.
Paszke, Adam et al., "PyTorch: An Imperative Style, High-Performance Deep Learning Library", NeurIPS, pp. 8024-8035, 2019.
Patrascu, Mihai, "Towards Polynomial Lower Bounds for Dynamic Problems", Proceedings of the 42nd ACM Symposium on Theory of Computing (STOC), 2010.
Phong, Le Trieu et al., "Privacy-Preserving Deep Learning via Additively Homomorphic Encryption", 8th International Conference on Applications and Techniques in Information Security (ATIS), 2017.
Qian, Ning, "On the momentum term in gradient descent learning algorithms", Neural Networks, vol. 12, pp. 145-151, 1999.
Rudelson, Mark and Vershynin, Roman, "Hanson-Wright inequality and sub-gaussian concentration", Electronic Communications in Probability, vol. 18, No. 82, pp. 1-9, 2013.
Russakovsky, Olga et al., "ImageNet Large Scale Visual Recognition Challenge", arXiv:1409.0575v3, Jan. 30, 2015.
Shokri, Reza and Shmatikov, Vitaly, "Privacy-Preserving Deep Learning", Proceedings of the 22nd ACM SIGSAC Conference on Computer and Communications Security, pp. 1310-1321, 2015.
Simonyan, Karen and Zisserman, Andrew, "Very Deep Convolutional Networks for Large-Scale Image Recognition", ICLR, arXiv:1409.1556v6, Apr. 10, 2015.
Song, Yang et al., "PixelDefend: Leveraging Generative Models to Understand and Defend Against Adversarial Examples", ICLR, arXiv:1710.10766v3, May 21, 2018.
Szegedy, Christian et al., "Intriguing properties of neural networks", NeurIPS, 2013.
Tramer, Florian et al., "On Adaptive Attacks to Adversarial Example Defenses", arXiv:2002.08347v2, Oct. 23, 2020.
Lecun, Yann et al., "The Mnist Database of Handwritten Digits", AT&T Labs, http://yann.lecun.com/exdb/mnist, accessed Jul. 20, 2023.
United States Department of Health & Human Services, "Summary of the HIPAA Privacy Rule", OCR Privacy Rule Summary, revised May 2003.
Vepakomma, Praneeth et al., "Split learning for health: Distributed deep learning without sharing raw patient data", CLR Workshop on AI for Social Good, arXiv:1812.00564v1, Dec. 3, 2018.
International Search Report and Written Opinion for corresponding International Application No. PCT/US2021/037813, dated Sep. 23, 2021.
Sharma et al., "Hiding Data in Images Using Cryptography and Deep Neural Network", Journal of Artificial Intelligence and System, vol. 1, pp. 143-162, 2019.
Huang et al., "InstaHide: Instance-hiding Schemes for Private Distributed Learning", arXiv:2010.02772v2 [cs.CR], Feb. 24, 2021. Retrieved from <URL:https://arxiv.org/pdf/2010.02772.pdf>, Retrieved on Aug. 27, 2021.

* cited by examiner

Algorithm 1 *Mixup* [ZCDLP18]

1: procedure MIXUP($W,T,X,Y$)
2:    $W$: the weights of the deep neural network; $T$: number of epochs; $X = \{x_1, ..., x_n\}$, $Y = \{y_1, ..., y_n\}$: the original dataset.
3:    Initialize $W$
4:    for $t = 1 \to T$ do
5:        Generate $\pi_1$ such that $\pi_1(i) = i$, $\forall i \in [n]$, and $k - 1$ random permutations $\pi_2, ..., \pi_k$: $[n] \to [n]$
            ▷ $[n]$ denotes $\{1, 2, ..., n\}$
6:        Sample $\lambda_1, ..., \lambda_n \sim [0,1]^k$ uniformly at random, and for all $i \in [n]$ normalize $\lambda_i$ such that $\|\lambda_i\|_1 = 1$.
7:        $\widetilde{D} \leftarrow \emptyset$
8:        for $i = 1 \to n$ do            ▷ Generate *Mixup* dataset
9:            $\widetilde{x}_i^{\text{mix}} \leftarrow \Sigma_{j=1}^k (\lambda_i)_j \cdot x_{\pi_j(i)}$         ▷ Mix images
10:           $\widetilde{y}_i \leftarrow \Sigma_{j=1}^k (\lambda_i)_j \cdot y_{\pi_j(i)}$            ▷ Mix labels
11:           $\widetilde{D} \leftarrow \widetilde{D} \cup (\widetilde{x}_i, \widetilde{y}_i)$
12:       end for
13:       Train $W$ using the *Mixup* dataset $\widetilde{D}$
14:   end for
15: end procedure

*FIG. 1*

Algorithm 2 Inside-dataset *InstaHide*

1: procedure INSTAHIDE($W,T,X,Y$)                       ▷ This paper
2:   $W$: weights of the neural network; $T$: number of epochs;
     $X = \{x_1, ..., x_n\}$: data; $Y = \{y_1, ..., y_n\}$: labels.
3:   Initialize $W$
4:   for $t = 1 \to T$ do
5:     Generate $\pi_1$ such that $\pi_1(i) = i, \forall i \in [n]$, and
       $k - 1$ random permutations $\pi_2, ..., \pi_k: [n] \to [n]$
6:     Sample $\lambda_1, ..., \lambda_n \sim [0,1]^k$ uniformly at random,
       and for all $i \in [n]$ normalize $\lambda_i \in \mathbb{R}^k$
       such that $\|\lambda_i\|_1 = 1$ and $\|\lambda_i\|_\infty \leq c_1$.
         ▷ $c_1 \in [0,1]$ is a constant that upper bounds a single coefficient
                                                              ▷ Definition 3.1
7:     Sample $\sigma_1, ..., \sigma_n \sim \Lambda_\pm^d$ uniformly at random.
8:     $\widetilde{D} \leftarrow \emptyset$
9:     for $i = 1 \to n$ do                    ▷ Generate *InstaHide* dataset
10:       $\widetilde{x}_i \leftarrow \sigma_i \circ \sum_{j=1}^k (\lambda_i)_j \cdot x_{\pi_j(i)}$    ▷ Encryption
11:       $\widetilde{y}_i \leftarrow \sum_{j=1}^k (\lambda_i)_j \cdot y_{\pi_j(i)}$                    ▷ Mix labels
12:       $\widetilde{D} \leftarrow \widetilde{D} \cup (\widetilde{x}_i, \widetilde{y}_i)$
13:     end for
14:     Train $W$ using the *InstaHide* dataset $\widetilde{D}$
15:   end for
16: end procedure

*FIG. 2*

Use InstaHide to IoT scenario

① Users encrypt their dataset using InstaHide and send the encrypted dataset to the server ② The server collects all encryptions and trains the model using them

Use InstaHide in Federated Learning scenario

① Users re-encrypt their dataset using InstaHide in every training epoch

② Users send model updates calculated using encrypted images

③ The server collects all model updates and sends back an aggregated update to users ④ Users update local models using the aggregated update

| Attacker has access to | Computation cost of attack |
|---|---|
| A single InstaHide encryption | $\|X\| \Omega(k_{pub})$ |
| Multiple rounds of InstaHide encryptions of a dataset | $O((m\|X\|)^2)$ |

FIG. 6

| | MNIST | CIFAR-10 | CIFAR-100 | ImageNet | Assumptions |
|---|---|---|---|---|---|
| Vanilla training | 99.5 ± 0.1 | 94.8 ± 0.1 | 77.9 ± 0.2 | 77.4 | - |
| DPSGD* | 98.1 | 72.0 | N/A | N/A | A1 |
| InstaHide inside, $k=4$, in inference | 98.2 ± 0.2 | 91.4 ± 0.2 | 73.2 ± 0.2 | 72.6 | - |
| InstaHide inside, $k=4$ | 98.2 ± 0.3 | 91.2 ± 0.2 | 73.1 ± 0.3 | 1.4 | - |
| InstaHide cross, $k=4$, in inference | 98.1 ± 0.2 | 90.3 ± 0.2 | 72.8 ± 0.3 | - | A2 |
| InstaHide cross, $k=4$ | 97.8 ± 0.2 | 90.7 ± 0.2 | 73.2 ± 0.2 | - | A2 |
| InstaHide cross, $k=6$, in inference | 97.4 ± 0.2 | 89.6 ± 0.3 | 72.1 ± 0.2 | - | A2 |
| InstaHide cross, $k=6$ | 97.3 ± 0.1 | 89.8 ± 0.3 | 71.9 ± 0.3 | - | A2 |

FIG. 7

Algorithm 1 $(m,k)$ - *TextHide*

1: procedure TEXTHIDE($E, M, k$)
2:         ▷ $E$: the training batch, $b$: $|E| = b$
3:         ▷ $M$: the mask pool, $m$: $|M| = m$
4:         ▷ $k$: number of training examples to be mixed
5:         ▷ Let $[b]$ denote the set $\{1, 2, ..., b\}$
6:     $\widetilde{E} \leftarrow \emptyset$
7:     Generate $\pi_1$ such that $\pi_1(i) = i, \forall i \in [b]$
8:     Generate $k - 1$ random permutations $\pi_2, ..., \pi_k: [b] \rightarrow [b]$
9:     Sample $\lambda_1, ..., \lambda_b \sim |N(0, I_k)| \in \mathbb{R}^k$ uniformly at random, normalize s.t. $\Sigma_{j=1}^{k}(\lambda_i)_j = 1, \forall i \in [b]$.
10:     for $(e_i, y_i) \in E$ do
11:         $\sigma_i \sim M$
12:         $\widetilde{e}_i \leftarrow \sigma_i \circ \Sigma_{j=1}^{k}(\lambda_i)_j \cdot e_{\pi_j(i)}$
13:         $\widetilde{y}_i \leftarrow \Sigma_{j=1}^{k}(\lambda_i)_j \cdot y_{\pi_j(i)}$
14:         $\widetilde{E} \leftarrow \widetilde{E} \cup \{(\widetilde{x}_i, \widetilde{y}_i)\}$
15:     end for
16:     return $\widetilde{E}$
17: end procedure

*FIG. 14*

Algorithm 2 Federated fine-tuning BERT using
$(m,k)$ - *TextHide* with $C$ clients (indexed by $c$)

1:   $m$: size of each client's mask pool
2:   $k$: number of training samples to be mixed
3:   $d$: hidden size (e.g., 768 in BERT)
4:   procedure SERVEREXECUTION($f_{\theta_1}, h_{\theta_2}$)
5:     ▷ $f_{\theta_1}$: the pre-trained BERT; $h_{\theta_2}$: a shallow classifer
6:     ▷ $T$: number of model updates, $\eta$: learning rate
7:     $f_{\theta_1}^1 \leftarrow f_{\theta_1}, h_{\theta_2}^1 \leftarrow h_{\theta_2}$
8:     for $t = 1 \rightarrow T$ do
9:       for each client $c$ in parallel do
10:         $\nabla_{\theta_1^t,c}, \nabla_{\theta_2^t,c} \leftarrow$ CLIUPDATE($c, f_{\theta_1}^t, h_{\theta_2}^t$)
11:       end for
12:       $\theta_1^{t+1} \leftarrow \theta_1^t - \frac{\eta}{C} \sum_{c=1}^{C} \nabla_{\theta_1^t,c}$
13:       $\theta_2^{t+1} \leftarrow \theta_2^t - \frac{\eta}{C} \sum_{c=1}^{C} \nabla_{\theta_2^t,c}$
14:     end for
15:     return $f_{\theta_1}^{T+1}, h_{\theta_2}^{T+1}$
16: end procedure
17: procedure CLIUPDATE($c, f_{\theta_1}, h_{\theta_2}$)     ▷ Run on Client $c$
18:       ▷ $b$: batch size; $D^c$: private train set of client $c$
19:       ▷ $M_c$: the mask pool of size $m$ owned by client $c$,
         masks are sampled i.i.d. from $\{-1,+1\}^d$
20:     Sample a random batch $\{x_i, y_i\}_{i \in [b]}$ from $D_c$
21:     $E = \{f_{\theta_1}(x_i), y_i\}_{i \in [b]}$
22:     $\widetilde{E} \leftarrow$ *TextHide*($E, M_c, k$)
23:     return $\nabla_{\theta_1} \mathcal{L}(f_{\theta_1}, h_{\theta_2}; \widetilde{E}), \nabla_{\theta_2} \mathcal{L}(f_{\theta_1}, h_{\theta_2}; \widetilde{E})$
24: end procedure

*FIG. 15*

| Dataset | \|D\| | Task | Metric | Baseline | TextHide$_{intra}$ | TextHide$_{inter}$ |
|---|---|---|---|---|---|---|
| RTE | 2.5k | NLI | Acc. | 72.0 (0.86) | 65.2 (1.71) | 54.4 (1.82) |
| MRPC | 3.7k | Paraphrase | F1 / Acc. | 90.2 (0.80) / 86.2 (1.40) | 89.7 (0.56) / 85.6 (0.96) | 88.1 (0.52) / 82.6 (0.75) |
| STS-B | 7k | Similarity | P / S corr. | 90.1 (0.12) / 89.7 (0.17) | 87.0 (0.25) / 87.0 (0.27) | 86.0 (0.27) / 86.2 (0.19) |
| CoLA | 8.5k | Acceptability | MCC | 58.9 (1.00) | 56.3 (0.86) | 52.3 (0.80) |
| SST-2 | 67k | Sentiment | Acc. | 92.4 (0.76) | 91.7 (0.51) | 91.3 (0.41) |
| QNLI | 108k | NLI | Acc. | 91.7 (0.70) | 91.0 (0.31) | 89.8 (0.56) |
| QQP | 364k | Paraphrase | F1 / Acc. | 87.9 (0.39) / 91.0 (0.30) | 87.3 (0.41) / 90.5 (0.33) | 86.5 (0.28) / 89.8 (0.14) |
| MNLI | 393k | NLI | m / mm | 86.1 (0.36) / 85.6 (0.23) | 84.0 (0.15) / 84.1 (0.23) | - |

*FIG. 16*

SST-2 (|D|: 67k)

QNLI (|D|: 108k)

| Baseline | k \ d | 4 | 16 | 64 | 256 | 1024 |
|---|---|---|---|---|---|---|
| | 1 | 0.76 | 0.56 | 0.30 | 0.22 | 0.08 |
| 0.82 | 2 | 0.00 | 0.00 | 0.00 | 0.00 | 0.00 |
| | 4 | 0.00 | 0.00 | 0.00 | 0.00 | 0.00 |

*FIG. 18*

CoLA

|  | Baseline | *Mix-only* | *TextHide* | Rand |
|---|---|---|---|---|
| Identity | 0.993 | 0.111 | 0.000 | 0.000 |
| $JC_{dist}$ | 0.999 | 0.184 | 0.023 | 0.024 |
| $TF\text{-}IDF_{sim}$ | 1.000 | 0.194 | 0.015 | 0.015 |
| Label | 0.998 | 0.759 | 0.494 | 0.542 |
| $SBERT_{sim}$ | 0.991 | 0.280 | 0.102 | 0.101 |

SST-2

|  | Baseline | *Mix-only* | *TextHide* | Rand |
|---|---|---|---|---|
| Identity | 0.992 | 0.064 | 0.000 | 0.000 |
| $JC_{dist}$ | 0.999 | 0.168 | 0.100 | 0.096 |
| $TF\text{-}IDF_{sim}$ | 1.000 | 0.080 | 0.007 | 0.008 |
| Label | 1.000 | 0.714 | 0.503 | 0.501 |
| $SBERT_{sim}$ | 1.000 | 0.275 | 0.202 | 0.209 |

Query1 (CoLA): Some people consider the noisy dogs dangerous. (✓)

*Baseline*: Some people consider the noisy dogs dangerous. (✓)
*Mix-only*: Some people consider the noisy dogs dangerous. (✓)
*TextHide*: I know a man who hates myself. (✗)

Query2 (SST-2): otherwise excellent (☺)

*Baseline*: otherwise excellent (☺)
*Mix-only*: worthy (☺)
*TextHide*: passive-aggressive (☹)

*FIG. 21*

SYSTEM AND METHOD FOR SECURE AND ROBUST DISTRIBUTED DEEP LEARNING

CROSS-REFERENCE TO RELATED APPLICATIONS

This application claims priority to provisional applications 63/040,300 and 63/110,005, filed Jun. 17, 2020 and Nov. 5, 2020, respectively, which are herein incorporated by reference in their entirety.

STATEMENT REGARDING FEDERALLY SPONSORED RESEARCH OR DEVELOPMENT

This invention was made with government support under Grant Nos. DMS-1638352 and CCF 1704860 awarded by the National Science Foundation. The government has certain rights in the invention.

FIELD OF THE INVENTION

The present invention relates generally to protecting privacy of users' data while performing machine learning methodologies on their data, more particularly, applying a lightweight cryptographic encryption of the data before using it as an input to machine learning methodologies.

BACKGROUND OF THE INVENTION

In many applications, a machine learning model, often a deep network, but also referred to as a neural network, needs to be trained at a central server using distributed datasets belonging to different parties, who wish to keep their data private.

One representative scenario is hospitals wishing to pool their patient data for training diagnostic algorithms, where use of such data is subject to privacy restrictions such as General Data Protection Regulation (GDPR), Health Insurance Portability and Accountability Act (HIPAA), and California Consumer Privacy Act (CCPA). Hence current distributed learning frameworks (notably Federated Learning) propose leaving sensitive training data with its owners but requiring them to actively participate in the training of the machine learning model. All parties use their private data to compute and share model updates or hidden-layer activations of the model with the central server. The server then aggregates these updates (typically by averaging) to construct an updated global model and communicates it back to all parties. This process may proceed for many rounds (called "epochs"). Henceforth this scenario will be referred to as the Federated Learning Scenario.

Another representative scenario is machine learning on data from low-power or computationally weak devices, for example Internet of Things (IoT) devices. The devices are not powerful enough to perform deep learning, and thus all data has to be sent to corporate servers for use in deep learning. Possibly this data use may be subject to privacy laws, or consumers may simply be uncomfortable with a direct handover of raw data from their IoT devices to the corporation. Henceforth this will be referred to as the IoT scenario, where data owners wish to allow deep learning on their data without actually handing it over in the clear. But being computationally limited they cannot participate in computation-heavy protocols.

There are various notions of privacy in the above scenarios, and the term "privacy" itself has many interpretations depending on the assumed threat models. The threat to privacy is greater in the IoT scenario, where the data owners are usually asked to send their raw data to corporate servers. But even in the Federated Learning scenario, recently published attacks show that attackers can reconstruct, partially or even completely, the private data by observing the communicated information (i.e., gradient updates) in the protocol. In these attacks an eavesdropping attacker who has access to all information communicated by all parties (e.g., the attacker could itself be a participant in the protocol) including the parameters of the model being trained is able to partially reconstruct the dataset. This will be the threat model assumed hereafter.

Cryptographic solutions such as Secure Multiparty Computation ensuring full privacy have existed for over 30 years. However, these protocols cannot scale to modern deep learning settings, owing to a running time that grows rapidly with the size of the deep net and the dataset. They also require special setups such as public-key encryption infrastructure to allow participants to encrypt data and communications before transmission and the server to decrypt before use in machine learning.

Methods that try to protect privacy, fully or partially, usually lead to some utility loss: either a computational overhead or a reduction in accuracy of the final machine learning method. As mentioned, traditional cryptographic methods such as multi-party computation or homomorphic encryption can ensure full privacy but they slow down computations by several orders of magnitude, and may require special setups. Differential privacy (DP) approach is another general framework to ensure certain amount of privacy by adding controlled noise to the training pipeline. However, it provides a weaker form of privacy: it only protects from information leakage due to the final trained model. It does not protect against eavesdroppers, who in the Federated Learning scenario could even be other protocol participants performing (unapproved) side computations on shared information. Furthermore, DP currently also causes significant reduction in accuracy of the final machine learning model due to the large amount of added noise. Recent work that applied DP to deep learning was able to somewhat reduce accuracy losses but they still remain relatively high.

Also of interest is providing data privacy for distributed deep learning for other application domains including Natural Language Processing. For example, healthcare institutions cooperatively train diagnostic systems on doctors' notes and patient data (Federated Learning scenario). Google trains a deep learning model for next-word prediction to improve its virtual keyboard using users' mobile device data (IoT scenario). Machine learning on text data often involves a special protocol whereby a pretrained language model is fine-tuned for the task at hand. Text data is different from image data, because text information is symbolic/discrete, whereas image pixels are real numbers. It is important to configure approaches that can ensure privacy for text data as well.

As such, there is a need for a general approach that ensures sufficient privacy without significantly reducing accuracy or slowing computation time, and preferably with minimum additional setup assumptions.

SUMMARY OF THE INVENTION

According to various embodiments, a method for encrypting image data for a neural network is disclosed. The method includes mixing the image data with other datapoints to form mixed data; and applying a pixel-wise random mask to the mixed data to form encrypted data.

According to various embodiments, a system for encrypting image data for a neural network is disclosed. The system includes at least one processor configured to mix the image data with other datapoints to form mixed data; and apply a pixel-wise random mask to the mixed data to form encrypted data.

According to various embodiments, a method for encrypting text data for a neural network for natural language processing is disclosed. The method includes encoding each text datapoint via a pretrained text encoder to form encoded datapoints; mixing the encoded datapoints with other encoded datapoints to form mixed data; applying a random mask to the mixed data to form encrypted data; and incorporating the encrypted data into training a classifier of the neural network and fine-tuning the text encoder.

According to various embodiments, a system for encrypting text data for a neural network for natural language processing is disclosed. The system includes at least one processor configured to: encode each text datapoint via a pretrained text encoder to form encoded datapoints; mix the encoded datapoints with other encoded datapoints to form mixed data; apply a random mask to the mixed data to form encrypted data; and incorporate the encrypted data into training a classifier of the neural network and fine-tuning the text encoder.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which:

FIG. 1 depicts a Mixup algorithm according to an embodiment of the present invention;

FIG. 2 depicts an InstaHide algorithm according to an embodiment of the present invention;

FIG. 6 depicts a table of running time for a naïve brute-force algorithm according to an embodiment of the present invention;

FIG. 7 depicts a table of test accuracy on MNIST, CIFAR-10, CIFAR-100 and ImageNet according to an embodiment of the present invention;

FIG. 14 depicts a TextHide algorithm according to an embodiment of the present invention;

FIG. 15 depicts an incorporation of federated learning algorithm according to an embodiment of the present invention;

FIG. 16 depicts a table of performance on GLUE tasks according to an embodiment of the present invention;

FIG. 18 depicts a table of success rate of 50 independent gradient inversion attacks according to an embodiment of the present invention;

FIG. 20 depicts tables of averaged similarity score of five metrics over 1000 independent RSS attacks on CoLA and SST-2 according to an embodiment of the present invention;

FIG. 21 depicts a table of example queries and answers of RSS with different representation schemes according to an embodiment of the present invention.

DETAILED DESCRIPTION OF THE INVENTION

Overview of InstaHide

Generally disclosed herein are embodiments for a new and efficient approach, referred to herein as InstaHide, that is inspired by the classic notion of instance hiding in cryptography. A related approach, TextHide, is also described for text data. Further disclosed are experiments to demonstrate the effectiveness of the disclosed approach in protecting privacy against known attacks while preserving data utility.

InstaHide gives a way to transform inputs to obfuscated/encrypted inputs such that: (a) training deep nets on the encrypted inputs using current algorithms and frameworks gives neural nets almost as good final accuracy (i.e., utility stays high); and (b) known attack methods for recovering the original inputs are computationally expensive. The approach can be deployed in several variants, depending upon the precise scenario and the security level needed. Below for concreteness, datapoints are sometimes referred to as "images" but the method has wider applicability.

One key aspect of InstaHide is inspired by a standard part of deep learning called Mixup data augmentation. The algorithm in FIG. 1 describes the Mixup approach, which creates new artificial datapoints using linear combinations of datapoints (as well as the corresponding linear combination of label vectors) and uses these artificial datapoints as new inputs for training the deep net. This is used to improve final accuracy of the deep net (i.e., generalization).

Figure 3:
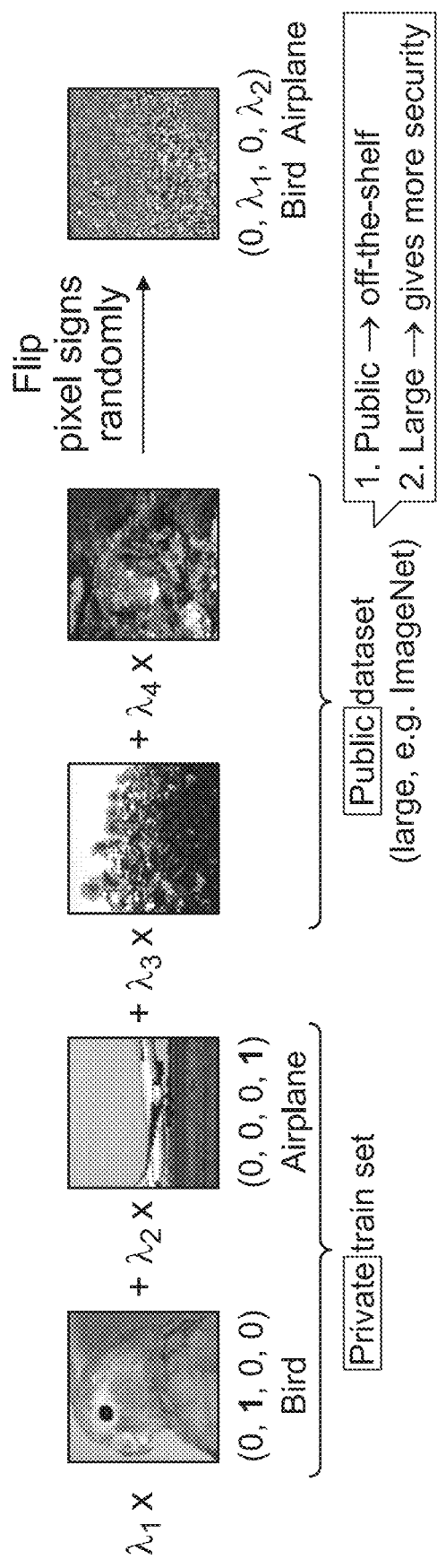
FIG. 3 depicts an example of encrypting the leftmost datapoint using InstaHide with k=4 according to an embodiment of the present invention.

InstaHide modifies this concept while creating the obfuscated/encrypted inputs (see FIG. 3 for an illustration of InstaHide). As a first step in generating new encrypted inputs for use in deep learning, training datapoints may be placed in linear combination with other datapoints from the training set, and/or with datapoints from other new datasets. Generating such linear combinations with random coefficients is inspired by Instance Hiding in cryptography, except there the combinations were done in finite fields instead of over real numbers. Modifying Mixup concepts for purposes of instance hiding in deep learning is a novel aspect of InstaHide and TextHide. In TextHide the Mixup modification is applied not to the data but to activations at a certain layer of deep net being trained.

The second key aspect in InstaHide is to take mixed-up inputs and apply a secret key $\sigma$ in the form of a pixel-wise mask that flips the sign of each pixel in the mixed datapoint with probability 1/2. Here it should be noted that datapoint pixels are signed real numbers. Applying random pixel-wise mask can be viewed as analogous to the instance hiding of cryptography which hides a secret input x inside x+r, where r is a random vector. Usually instance hiding is done over finite fields. If arithmetic is over the field of integers modulo 2, then x+r involves flipping x in a random set of coordinates, which is equivalent to sign flip in those coordinates. Over real numbers, the analogous operation to XOR is multiplication by −1 in a random subset of coordinates. Multiplying by −1 in a random subset of coordinates is exactly the pixel-wise mask mentioned above. This random subset is only known to the owner of the data and can be seen as a one-time secret key.

Utilizing both components of InstaHide, namely, Mixup with random datapoints of various datasets, and random pixel-wise mask, will obtain the best privacy benefits. Using either alone may allow easier attacks, as can be shown both by theory and experiments.

The next aspect is to apply Mixup in a cross-dataset way. Each datapoint of the training dataset is mixed up with datapoints from a second (and usually larger) dataset. This has no analog in normal deep learning and would generally make no sense there. Even for security purposes such a scheme could become impractical (especially in the IoT scenario) if it were to require protocol participants (which could be low-power devices) to create large private datasets on the fly merely to participate in deep net training. Thus, the scheme allows clients to use datapoints from a large public dataset such as ImageNet, which has over 10 million datapoints.

Now the default version of InstaHide can be described. It involves mixing a training datapoint x with k/2 randomly chosen datapoints from its private training dataset and k/2 randomly chosen datapoints from a public dataset like ImageNet, and then applying a private sign-flip mask to get the encrypted form x̃. All parties participate in training using only such encrypted datapoints. In the Internet of Things (IoT) scenario the users would send x̃ to the server instead of the original datapoint. In the Federated Learning Scenario, users would use x̃ to run their protocol. If the protocol is run for multiple epochs (an epoch being a full round of updates during the training) then a new encryption is created for each epoch. Thus, in Federated Learning Scenario the training dataset is effectively being converted into a somewhat larger dataset of encrypted datapoints.

Security of InstaHide: The recommended default above was based upon a study of the efficacy of possible attacks, and some security arguments and estimates for security of InstaHide based on the underlying computation problem of recovering (fully partially) the input from the encryption. Experiments on MNIST, CIFAR-10, and CIFAR-100 datasets suggest that InstaHide is highly effective at hiding images. It provides better tradeoff between privacy preservation and utility than a standard differential privacy approach. It is computationally lightweight compared to traditional cryptographic methods, but the level of privacy it provides may be good enough in many applications.

Figure 4:
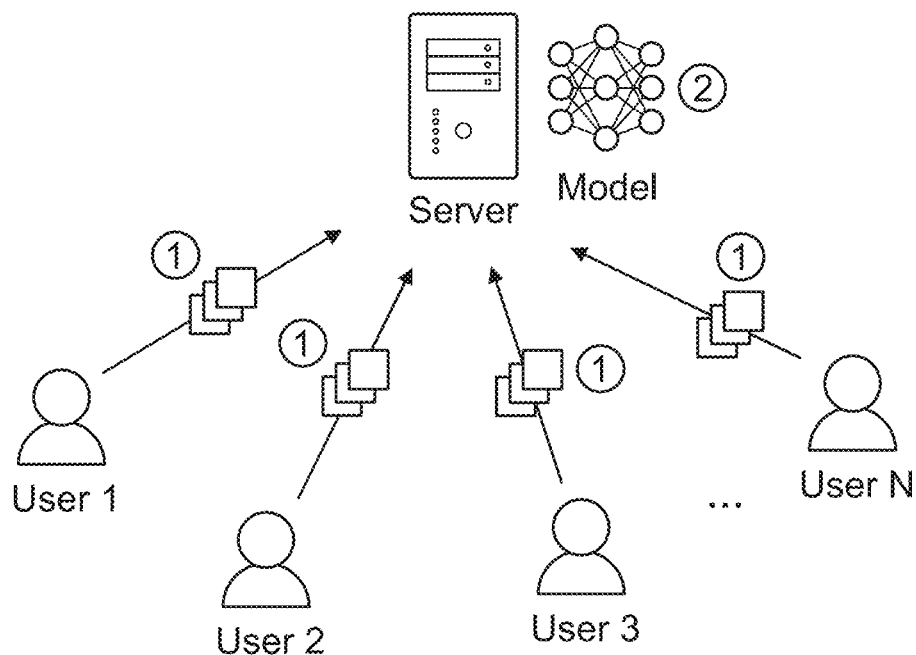
FIG. 4 depicts the use case of InstaHide encryption in the Internet of Things (IoT) scenario according to an embodiment of the present invention.
Figure 5:
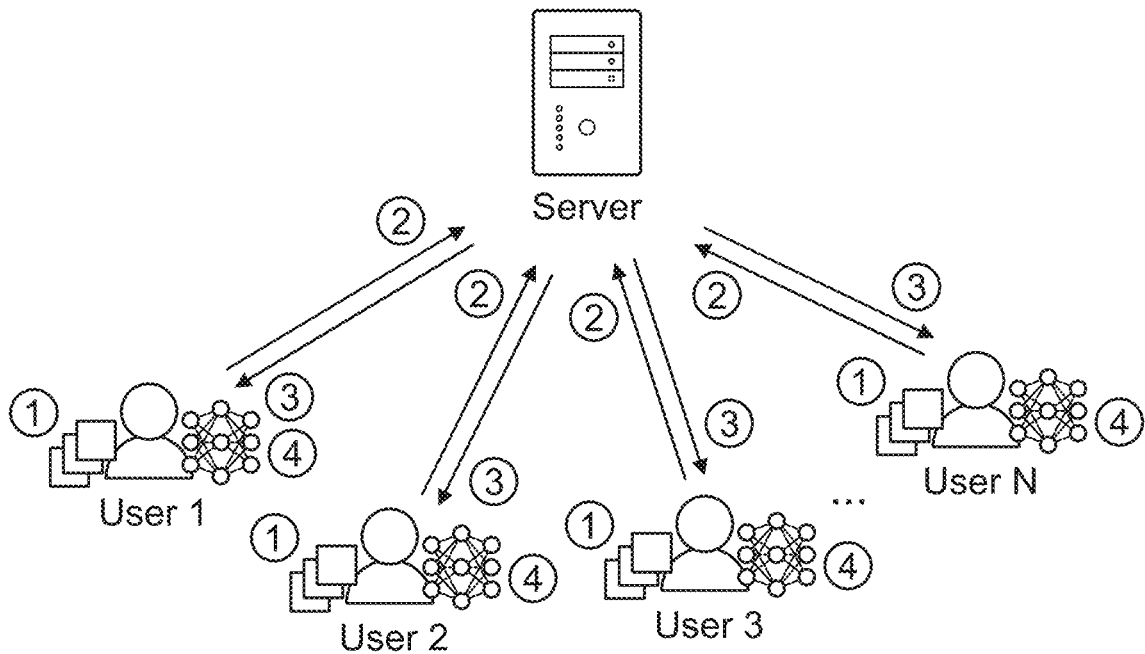
FIG. 5 depicts the use case of InstaHide encryption in the Federated Learning scenario according to an embodiment of the present invention.

Enhanced functionality due to InstaHide: As hinted above, InstaHide plugs seamlessly into existing frameworks such as distributed or federated learning (see FIG. 5): clients encrypt their inputs on the fly with InstaHide and participate in training (they can turn off differential privacy). InstaHide also allows new forms of distributed learning in the IoT scenario that are unsafe in current frameworks (see FIG. 4). For instance, computationally limited clients can encrypt each private input x to its encrypted form x̃ "on the fly" and ship it to the central server for all subsequent computation. The server performs standard deep learning on encrypted inputs and sends the trained model back to all clients at the end, with no need for multiple rounds of communication of gradients and parameter vectors. If the private input is used in only one or a small number of encryptions (for instance, less than 5-10 times) then this appears to be secure against known attacks as sketched below.

Comparison with differential privacy (DP): As noted, DP's privacy guarantee only protects against privacy loss due to release of the trained model, and not due to side computations by eavesdroppers or the central server itself. DP does not have any known instance-hiding properties against such side computations. Furthermore, computing a DP-based privacy guarantee for deep nets is not easy. Even for CIFAR-10 (a relatively small dataset), applying DP with a provable guarantee required resorting to a simple deep net with pretrained convolutional layers (using additional datapoints), followed by careful retuning of a few layers using the sensitive data. This methodology seemed to limit accuracy to at most 75%, and perhaps even a few percent lower when noise level is made high enough for nontrivial privacy guarantees. By contrast, embodiments of the disclosed scheme works with state-of-the-art deep architectures and final accuracy exceeds 91% on CIFAR10 (in other words, only a few percent less than for completely insecure computation). DP's privacy guarantee is unconditional and mathematically computed, whereas with InstaHide, it relies on conjectured intractability of a computational problem.

Further, generally disclosed herein are embodiments for addressing the challenge in mitigating privacy risks without slowing down training or reducing accuracy for natural language understanding tasks. Referred to herein as TextHide, embodiments require all participants to add an encryption step to prevent an eavesdropping attacker from recovering private text data. Such an encryption step is efficient and only affects the task performance slightly. In addition, TextHide fits well with the popular framework of fine-tuning pre-trained language models (e.g., BERT) for any sentence or sentence-pair task. TextHide is evaluated on the GLUE benchmark, and experiments show that TextHide can effectively defend against attacks on shared gradients or representations and the averaged accuracy reduction is only 1.9%.

Single-Dataset InstaHide

The algorithm in FIG. 2 presents the simplest InstaHide that mixes datapoints within the training dataset. To encrypt a private datapoint x, InstaHide first randomly chooses a set of k−1 other datapoints to mix with, as well as random coefficient λ's for all of them with the constraint that the coefficients are at most c1 to avoid dominance of any single datapoint (line 6). Then the algorithm samples a random mask σ apply σ•x, where • is coordinate-wise multiplication of vectors (line 10). Note that the random mask will not be reused to encrypt other datapoints. It constitutes a "random one-time private key."

A priori. it may seem that using a different pixel-wise mask for each training sample would completely destroy the accuracy of the trained net, but as shown later it has only a small effect when k is small.

Random Mask Definition: Let $\Lambda^d_\pm$ denote the d-dimensional random sign distribution such that $\forall \sigma \sim \Lambda^d_\pm$, for $i \in [d]$, $\sigma_i$ is independently chosen from $\{\pm 1\}$ with probability 1/2 each.

Cross-Dataset InstaHide

It is also disclosed herein to combine datapoints from different datasets. The motivation for mixing with another dataset arises from the observation that real-world privacy-sensitive datasets, e.g. medical scans, usually have simple signal patterns of limited size occurring in the same place. Applying Single-Dataset InstaHide on such datasets may suffer from significant privacy leakage.

This motivates an alternative InstaHide that may be referred to as Cross-dataset InstaHide. Assume there is a privacy sensitive dataset $D_{private}$ and a large public dataset $D_{public}$. For a cross-dataset InstaHide with k datapoints, k/2 datapoints from $D_{private}$ and k/2 from $D_{public}$ are randomly chosen, and the same mixing and masking as in Single-Dataset InstaHide is applied to these images. The one difference in the cross-dataset scheme is that the model is trained to learn only the label of $D_{private}$ datapoints, since the images from the public dataset $D_{public}$ do not have meaningful labels.

Difficulty of Attacking InstaHide

This section demonstrates why InstaHide provides privacy, especially in the IoT scenario. Note that attacking in the FL scenario should be more difficult than attacking the IoT scenario, as InstaHide datapoints are not directly exposed to the attacker. Recent evaluations suggest applying InstaHide in the FL scenario essentially stops the attacks even under strongest attack models that have been considered.

Continuing with the example of the vision task with an original dataset. Let $(\tilde{x}, \tilde{y})$ denote an inside-InstaHide (image, label)-pair of k private images from a dataset with n datapoints. The analyses are provided for two cases: a) the attacker only has access to a single InstaHide datapoint $\tilde{x}$, and b) the attacker has access to m×n InstaHide datapoints, where m is the round of encryptions.

a) Attacker only has access to a single InstaHide datapoint. Under the assumed attack model described earlier, for worst-case choices of images (i.e., when an "image" is allowed to be an arbitrary sequence of pixel values), the computational complexity of recovering input x hidden inside InstaHide encryption $\tilde{x}$ is related to the famous k-SUM problem, whose complexity is conjectured to be $n^k$ under a strong form of the P vs NP conjecture. Using k>2 gives a computation cost that is at least quadratic in the size of dataset. However, in most realistic scenarios, the attacker will have access to multiple encryptions of a single datapoint as discussed below.

b) Attacker has access to multiple rounds of InstaHide encryption of the dataset. Attack in such a scenario recovers the whole dataset instead of a single datapoint: it would involve first solving a combinatorial algorithm to infer which subset of the InstaHide datapoints contains the same original datapoint, and then run a regression algorithm based on the encryption mapping and recover the whole dataset. The time to launch this attack is at least quadratic in m×n, i.e. the number of total InstaHide encryptions. A recent attack has been proposed in the IoT scenario, but with the approach being when the private dataset is of moderate size (e.g. $n=10^4$) and there are m=100 rounds of encryption, the time estimate to recover the whole dataset will be larger than 5,000 GPU hours. This running time scales quadratically with total number of encrypted images.

Computation cost of attacks in different cases is summarized in FIG. 6.

Experiments

Experiments have been conducted to answer three questions:

(1) How much accuracy loss does InstaHide suffer?
(2) How is the accuracy loss of InstaHide compared to differential privacy approaches?
(3) Can InstaHide defend against known attacks?

In particular, the answers to these questions are determined when k=4, which is suggested by the above to be secure against a naive attacker.

Datasets and Setup: The main experiments are image classification tasks on three datasets MNIST, CIFAR-10, and ImageNet. ResNet network architecture is used for the experiments and the experiments are implemented using the Pytorch framework. Note greyscale MNIST images are converted to be 3-channel RGB images in these experiments.

Utility of InstaHide

The following InstaHide variants have been evaluated (with $c_1=0.65$, $c_2=0.3$):

(1) Single-dataset InstaHide with different k's, where k is chosen from $\{1, 2, 3, 4, 5, 6\}$
(2) Cross-dataset InstaHide with k=4, 6. For MNIST, CIFAR-10 has been used as the public dataset; for CIFAR-10 and CIFAR-100, the preprocessed ImageNet has been used as the public dataset. The evaluation does not test Cross-dataset InstaHide on ImageNet since its sample size is already large enough for good security.

The computation overhead of InstaHide in terms of extra training time in the experiments is smaller than 5%.

Figure 8A:
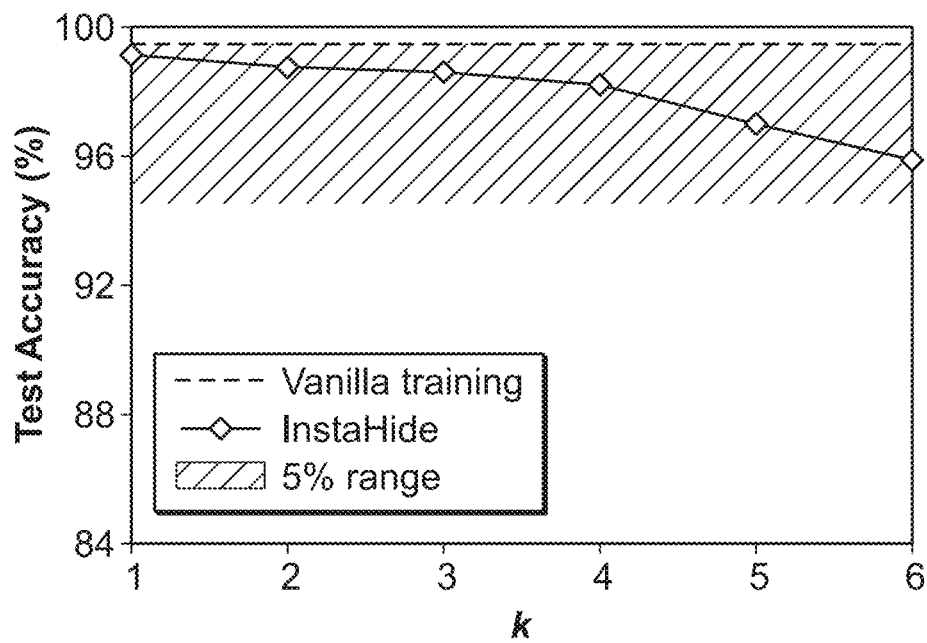
FIG. 8(a) depicts a graph of test accuracy on MNIST with different k, the number of mixed datapoints, according to an embodiment of the present invention.
Figure 8B:
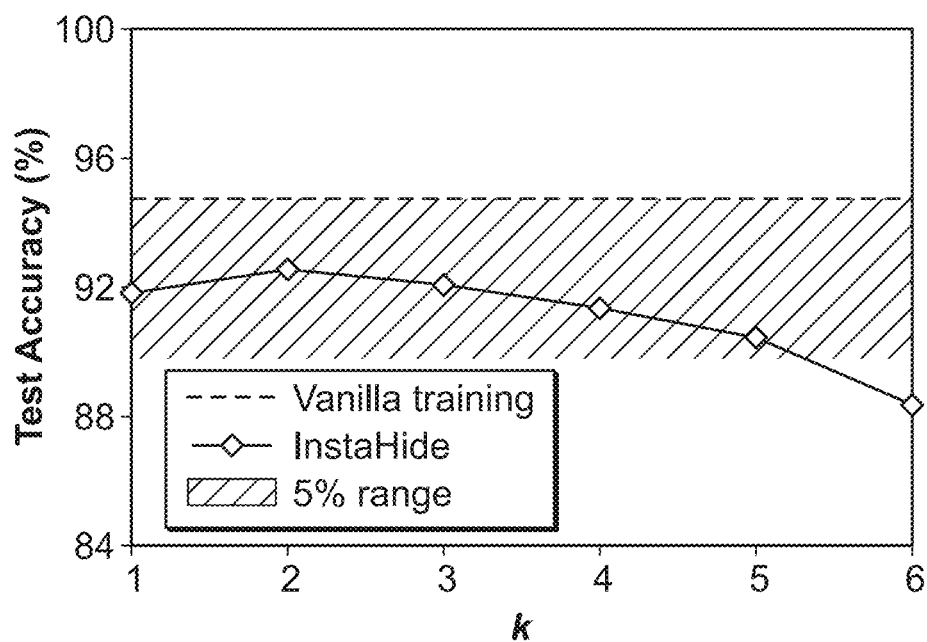
FIG. 8(b) depicts a graph of test accuracy on CIFAR-10 with different k, the number of mixed datapoints, according to an embodiment of the present invention.
Figure 8C:
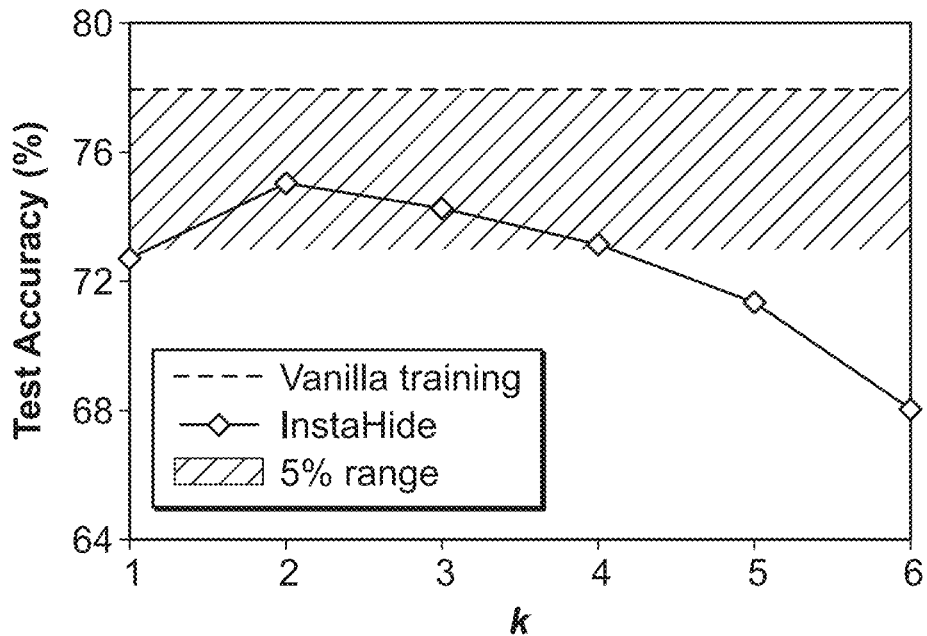
FIG. 8(c) depicts a graph of test accuracy on CIFAR-100 with different k, the number of mixed datapoints, according to an embodiment of the present invention.

Accuracy with different k's. FIGS. 8(a)-(c) show the test accuracy of vanilla training, and single-dataset InstaHide with different k's on MNIST, CIFAR-10 and CIFAR-100 benchmarks. Compared with vanilla training, InstaHide with k=4 only suffers small accuracy loss of 1.3%, 3.4%, and 4.7% respectively. Also, increasing k from 1 (i.e., apply mask on original images, no Mixup) to 2 (i.e., apply mask on pairwise mixed images) improves the test accuracy for CIFAR datasets, suggesting that Mixup data augmentation also helps for InstaHide-encrypted images.

Single-dataset v.s. Cross-dataset. The evaluation also includes the performance of Cross-dataset InstaHide, which does encryption using random images from both the private dataset and a large public dataset. As shown in FIG. 7, Cross-dataset InstaHide incurs an additional small accuracy loss compared with single-dataset InstaHide. The total accuracy losses for MNIST, CIFAR-10 and CIFAR-100 are 1.7%, 4.1%, and 4.7% respectively. As previously suggested, a large public dataset provides a stronger notion of security.

Inference with and without InstaHide. By default, InstaHide is applied during inference. In the experiments, the inference averages predictions of 10 encryptions of a test image. The experiments suggest that for high-resolution images, applying InstaHide during inference is important: the results of using Inside-dataset InstaHide on ImageNet in FIG. 7 show that the accuracy of inference with InstaHide is 72.6%, whereas that without InstaHide is only 1.4%.

InstaHide Vs. Adding Random Noise

Although InstaHide is qualitatively different from differential privacy in terms of privacy guarantee, the evaluation has tried to provide hints for their relative accuracy.

Comparison with DPSGD. DPSGD injects noise to gradients to control private leakage. FIG. 7 shows that DPSGD leads to an accuracy drop of about 20% on CIFAR-10 dataset. By contrast, InstaHide gives models almost as good as vanilla training in terms of test accuracy.

Figure 9A:
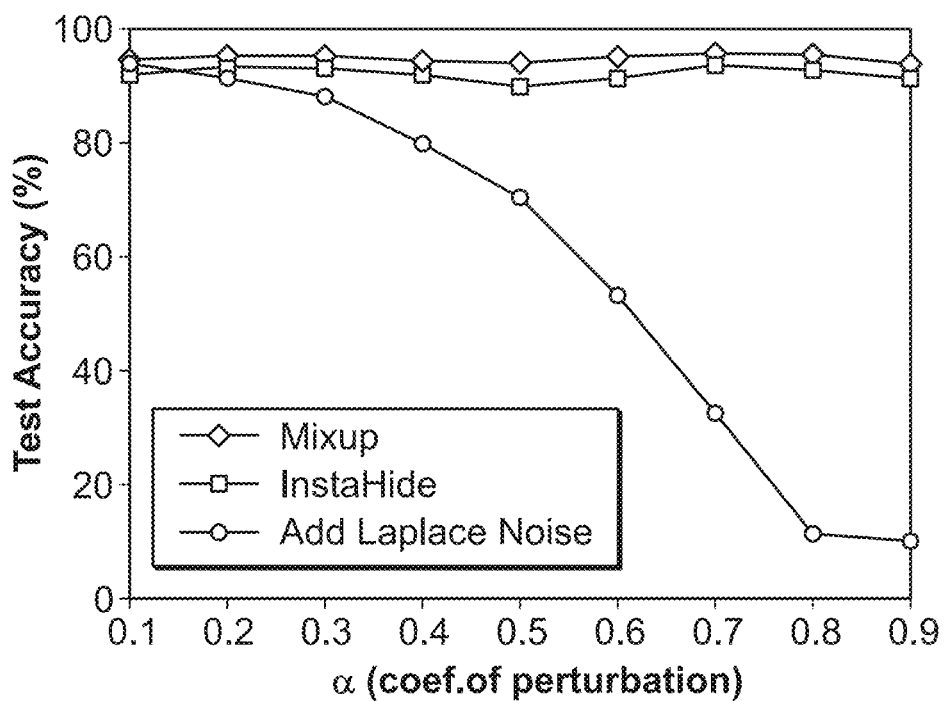
FIG. 9(a) depicts a graph of test accuracy on CIFAR-10 with various alphas according to an embodiment of the present invention.
Figure 9B:
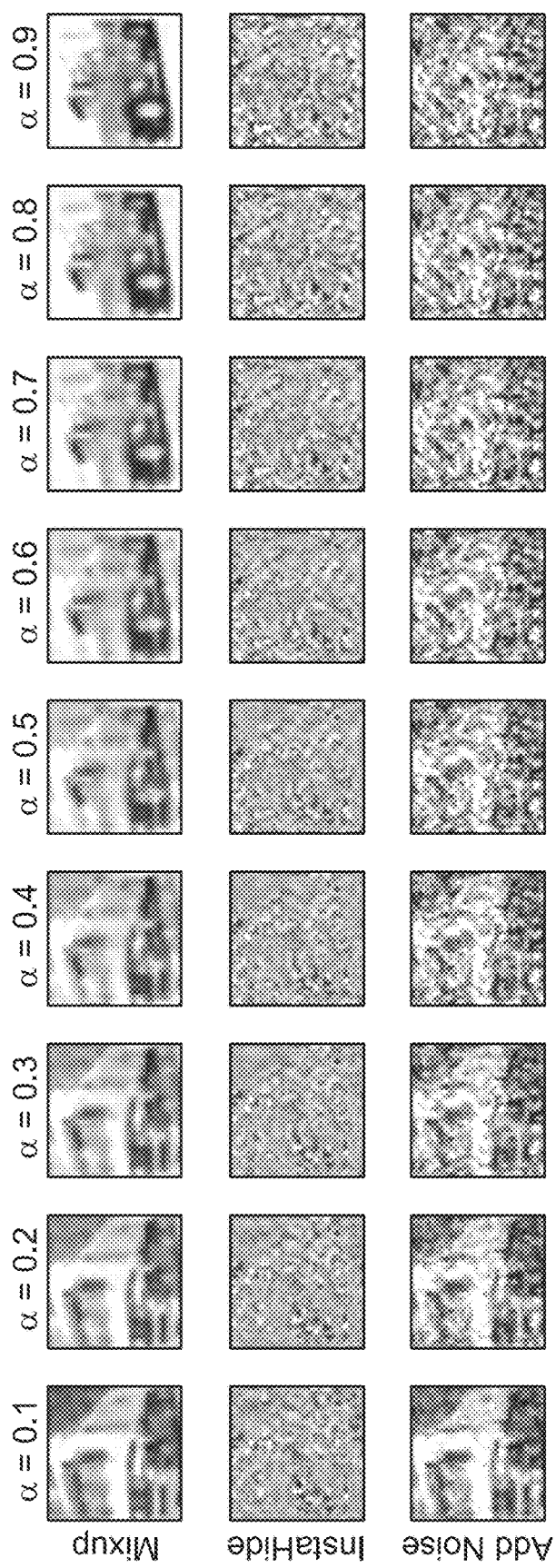
FIG. 9(b) depicts a visualization of perturbed datapoints generated by InstaHide and adding Laplace noise, with various alphas according to an embodiment of the present invention.

Comparison with adding random noise to images. The evaluation has also compared InstaHide (i.e., adding structured noise) with adding random noise to images (another typical approach to preserve differential privacy). As shown in FIGS. 9($a$)-($b$), by increasing $\alpha$, the coefficient of noise, from 0.1 to 0.9, the test accuracy of adding random noise drops from ~94% to ~10%, while the accuracy of InstaHide is above 90%.

Defending Against Attacks

To answer the question how well InstaHide can defend known attacks, the experiments have covered a variety of attacks on a single InstaHide-encrypted image to recover the original image, including the gradient inversion attack, demasking using GAN (Generative Adversarial Network), and uncovering public images with similarity search. Attacks that launch on multiple rounds of InstaHide-encrypted images have been analyzed above.

Figure 10A:
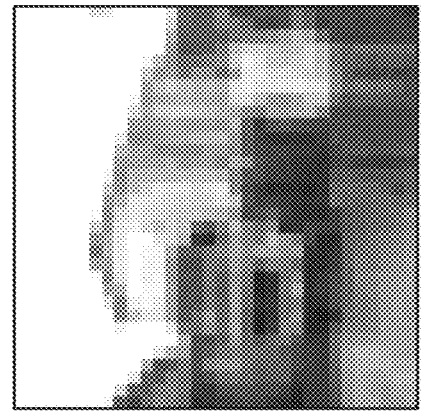
FIG. 10(a) depicts a visualization of an original image according to an embodiment of the present invention.
Figure 10B:
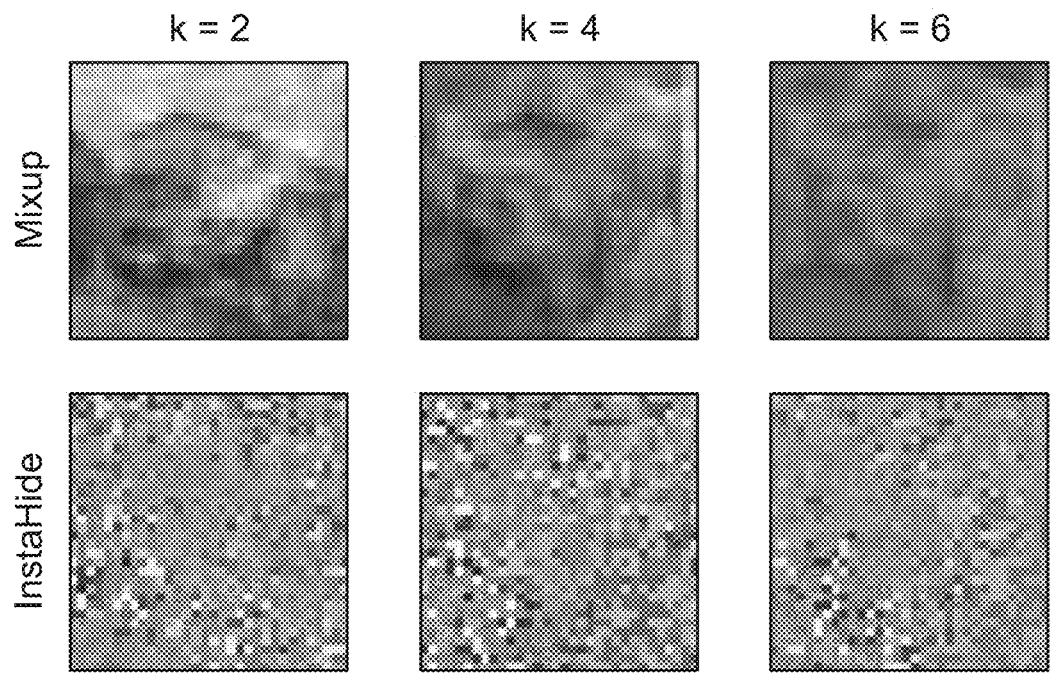
FIG. 10(b) depicts a visualization of Mixup and InstaHide images according to an embodiment of the present invention.
Figure 10C:
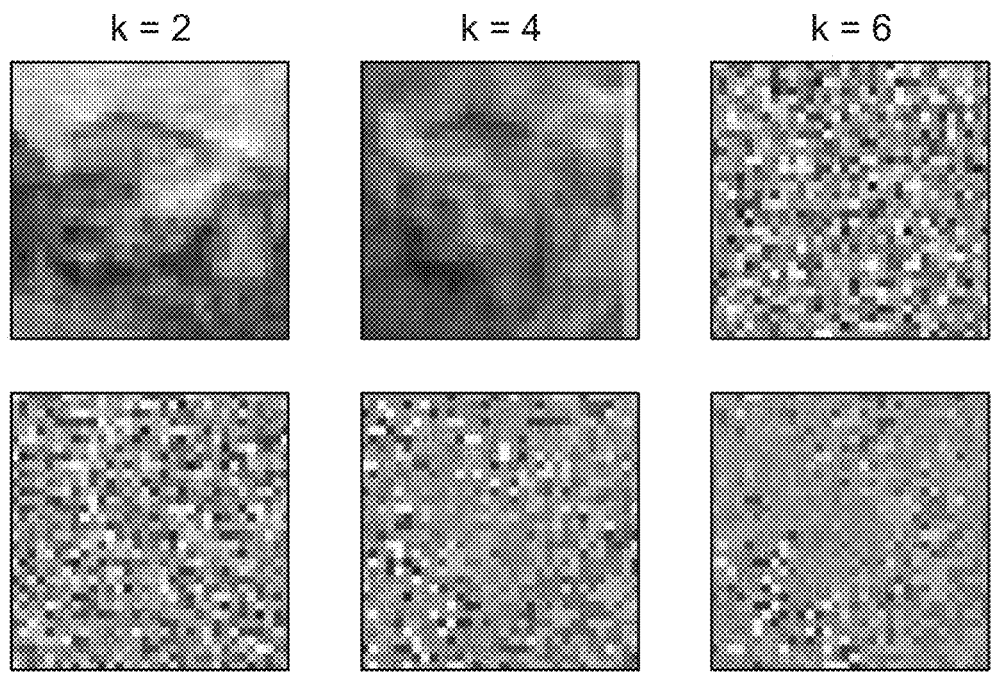
FIG. 10(c) depicts a visualization of images recovered by the gradient inversion attack according to an embodiment of the present invention.

Gradient inversion attack: InstaHide is tested against a gradient inversion attack which were published in recent years for Federated Learning scenario. Given a public deep model, the attacker observes gradients generated by an input x, and tries to recover x by composing a sample x* that has similar gradients to those of x. As suggested earlier, the upper bound on the privacy loss in gradients matching attack is the loss when attacker is given x̃. FIGS. 10($a$)-($c$) show results of this attack on Mixup and InstaHide schemes on CIFAR-10. If Mixup with k=4 is used, the attacker can still extract a fair bit of information about the original image. However, if InstaHide is used the attack is not successful.

Figure 11:
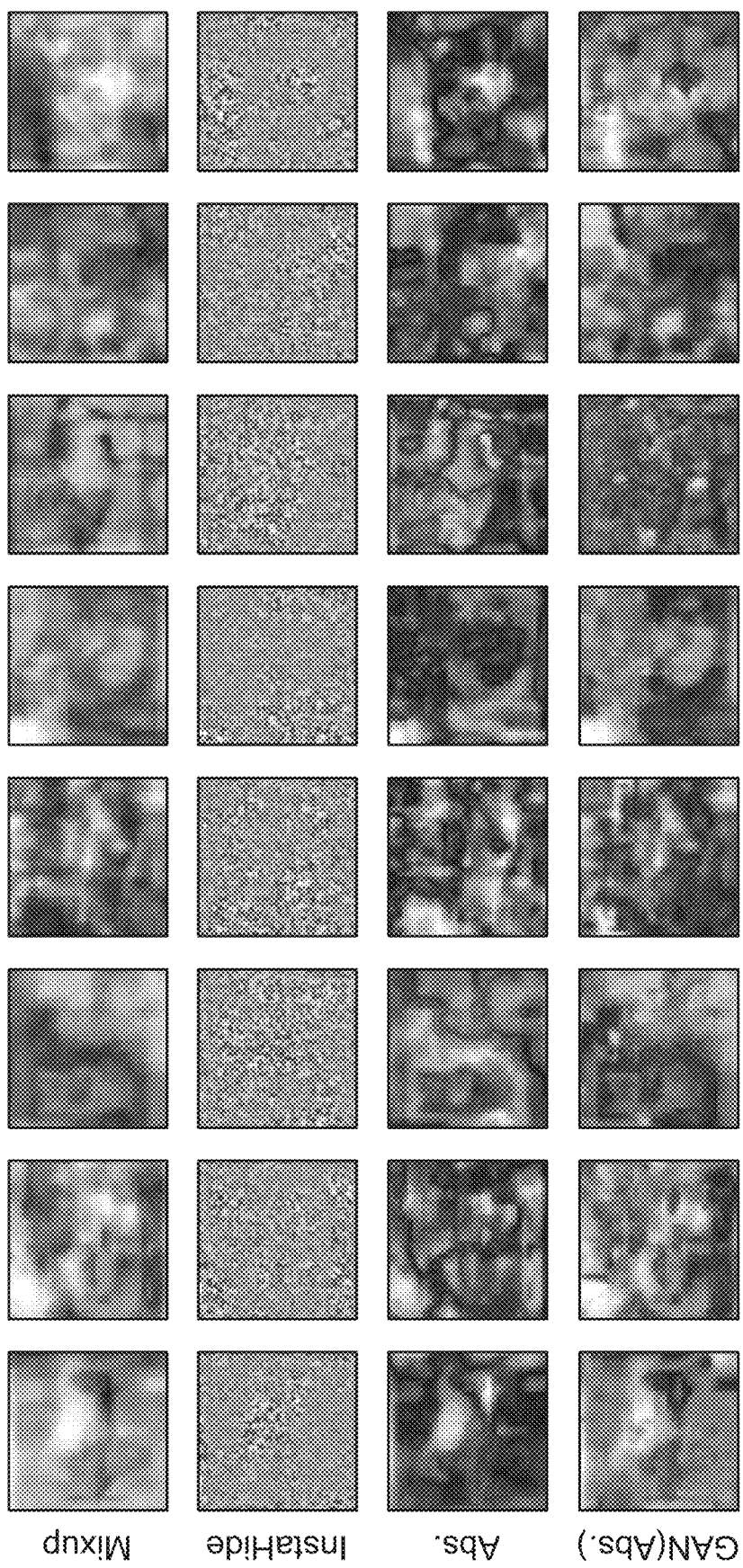
FIG. 11 depicts a visualization of attack results by undoing sign-flipping of InstaHide encodings using GAN according to an embodiment of the present invention.

Demask using GAN. InstaHide does pixel-wise random sign-flip after applying Mixup. This flips the signs of half the pixels in the mixed image. An alternative way to think about it is that the adversary sees the intensity information (i.e. absolute value) but not the sign of the pixel. Attackers could use computer vision ideas to recover the sign. One attack consists of training a GAN on this sign-recovery task, using a large training set of (z, σ•z) where z is a mixed image and σ is a random mask. If this GAN recovers the signs reliably, this effectively removes the mask, after which one could use the attacks against Mixup described earlier. In experiments this only succeeded in recovering half the flipped signs, which means ~¼ of the coordinates continued to have the wrong sign. See FIG. 11.

Figure 12:
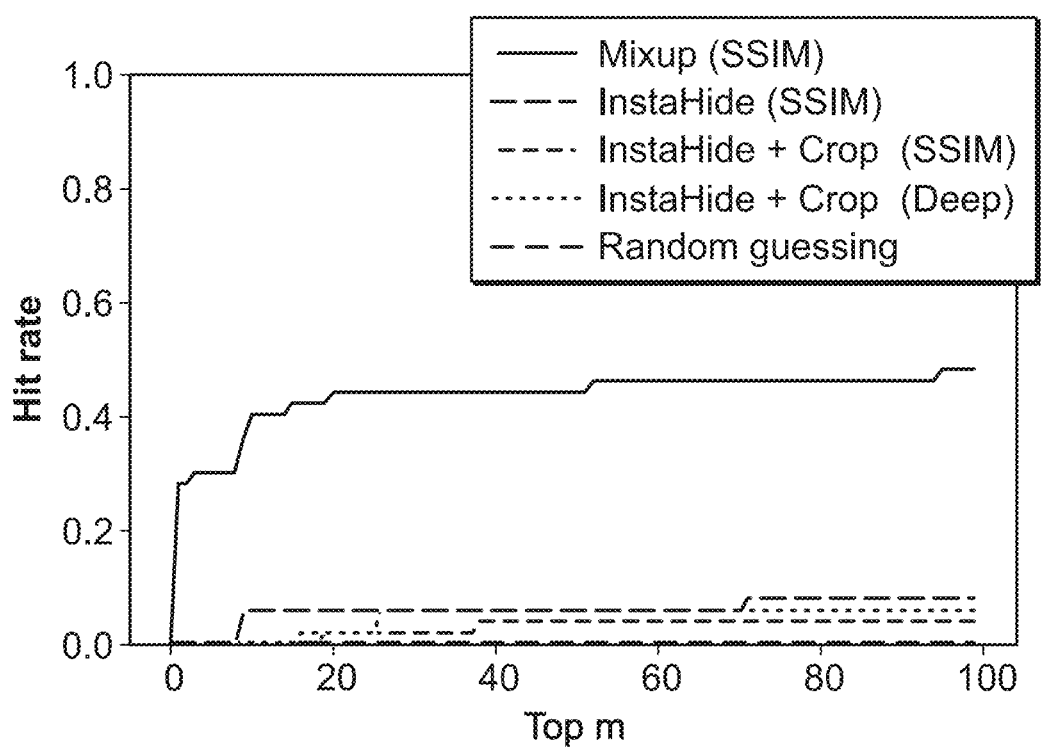
FIG. 12 depicts the averaged hit rate of uncovering public images used for cross-dataset InstaHide mixing by similarity search according to an embodiment of the present invention.

Uncover public images by similarity search. After demasking cross-dataset InstaHide-encrypted images using GAN, the attack further tries to uncover the public images for mixing, by running similarity search in the public dataset using the demasked InstaHide-encrypted image as the query. The evaluation considers the attack a 'hit' if at least one public image for mixing is among the top-m answers of the similarity search. The attacker uses SSIM as the default similarity metric for search. However, a traditional alignment-based similarity metric (e.g SSIM) would fail in InstaHide schemes which use randomly cropped patches of public images for mixing, so in that case, the attacker trains a deep model to predict the similarity score. As shown, even with a relatively small public dataset (N=10,000) and a large m=√N, the hit rate of this attack on InstaHide (enhanced with random cropping) is around 0.05. See FIGS. 12($a$)-($c$). Another variant of this attack does similarity search using higher moments of images as the metric, and is able to shrink the candidate search space for public images by a large factor.

InstaHide and its Challenges for NLP

InstaHide has achieved good performance in computer vision for privacy preserving distributed learning, by providing a cryptographic security while incurring much smaller utility loss and computation overhead than the best approach based on differential privacy.

There are two challenges to apply InstaHide to text data for language understanding tasks. The first is the discrete nature of text, while the encryption in InstaHide operates at continuous inputs. The second is that most NLP tasks today are solved by fine-tuning pretrained language models such as BERT on downstream tasks. It remains an open question how to add encryption into such a framework and what type of security argument it will provide. It should be noted that while BERT is described herein, any pretrained language model could utilize TextHide.

TextHide

There are two key aspects of TextHide. The first one is using the "one-time secret key" coming from InstaHide for encryption, and the second is an approach to incorporate such encryption into the popular framework of solving language tasks by fine-tuning a pre-trained language model, e.g., BERT. These pretrained models are widely available and were trained using gigantic text corpora.

Figure 13:
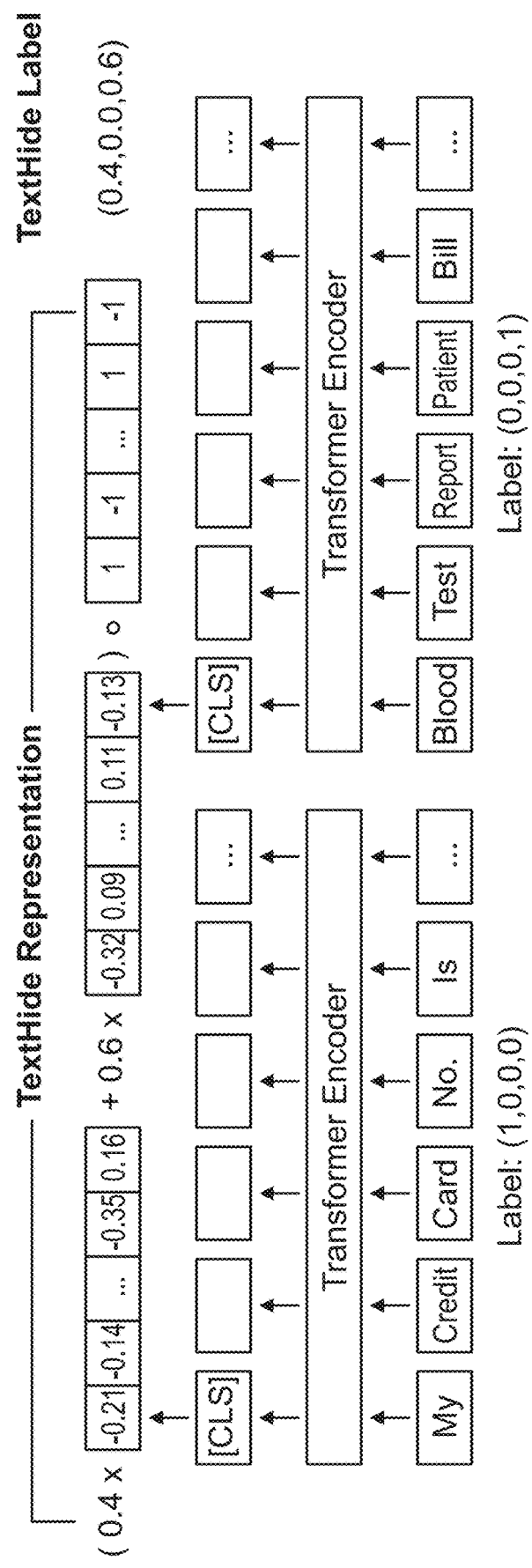
FIG. 13 depicts an illustration of TextHide encryption according to an embodiment of the present invention.
Figure 17A:
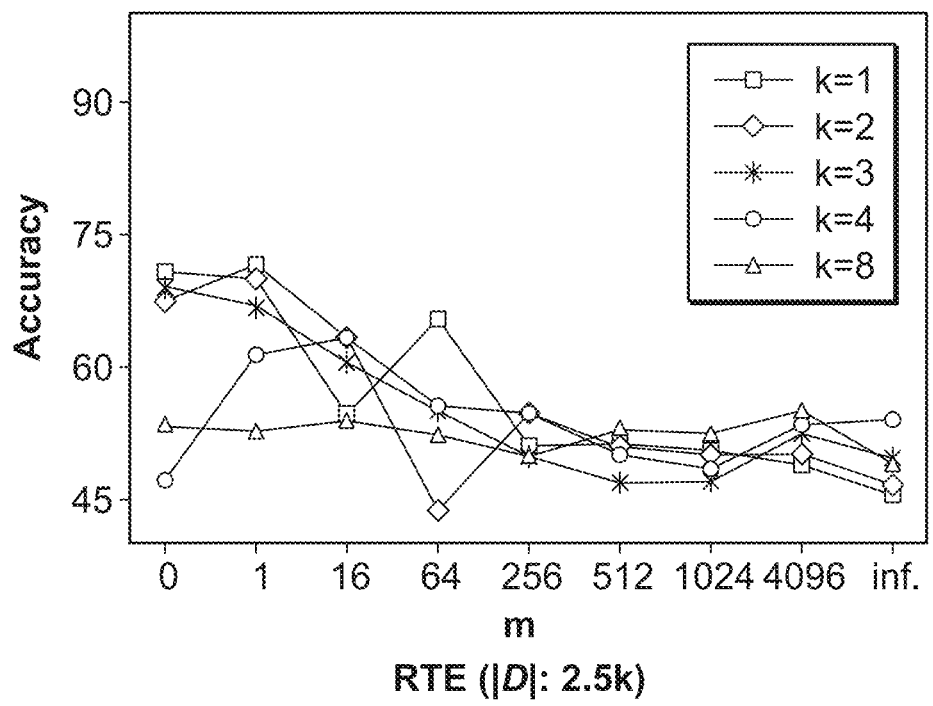
FIG. 17(a)-(h) depicts graphs of performance of TextHide on GLUE tasks of different (m, k) pairs according to an embodiment of the present invention.
Figure 17B:
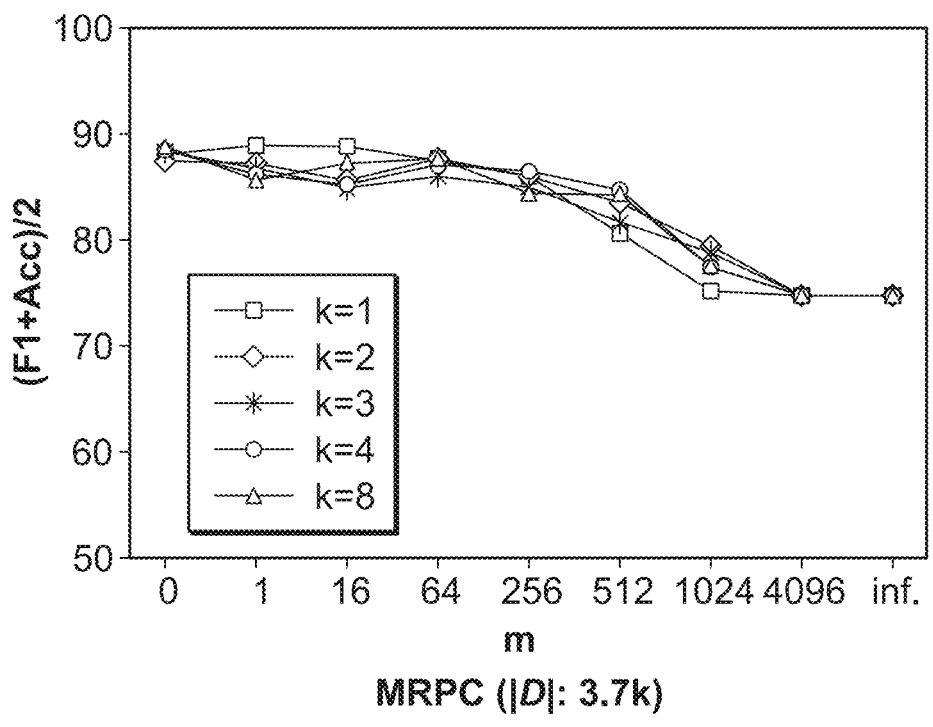
Figure 17C:
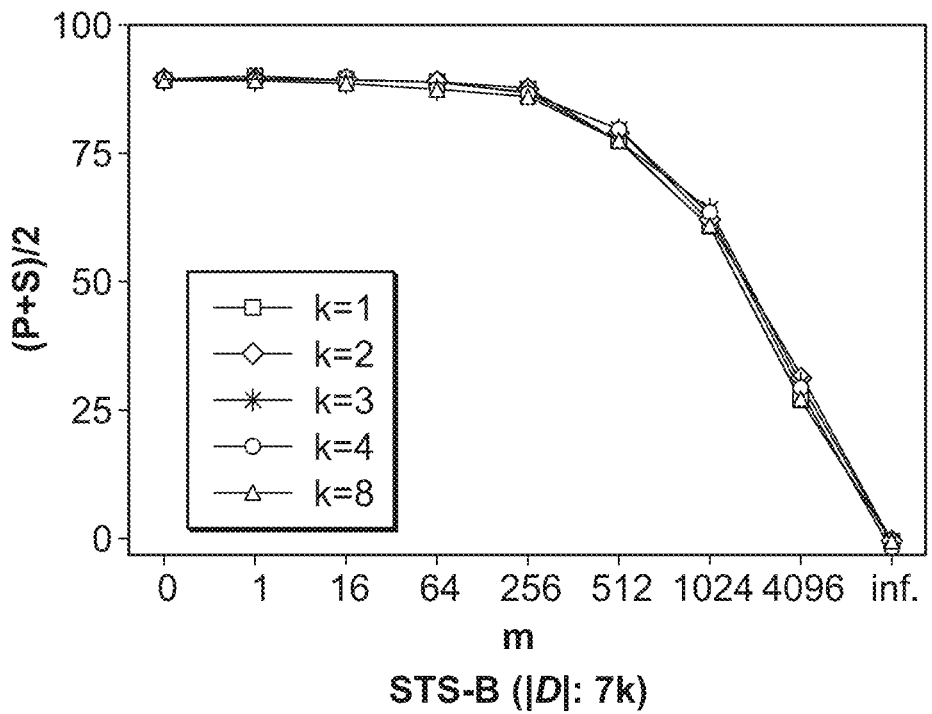
Figure 17D:
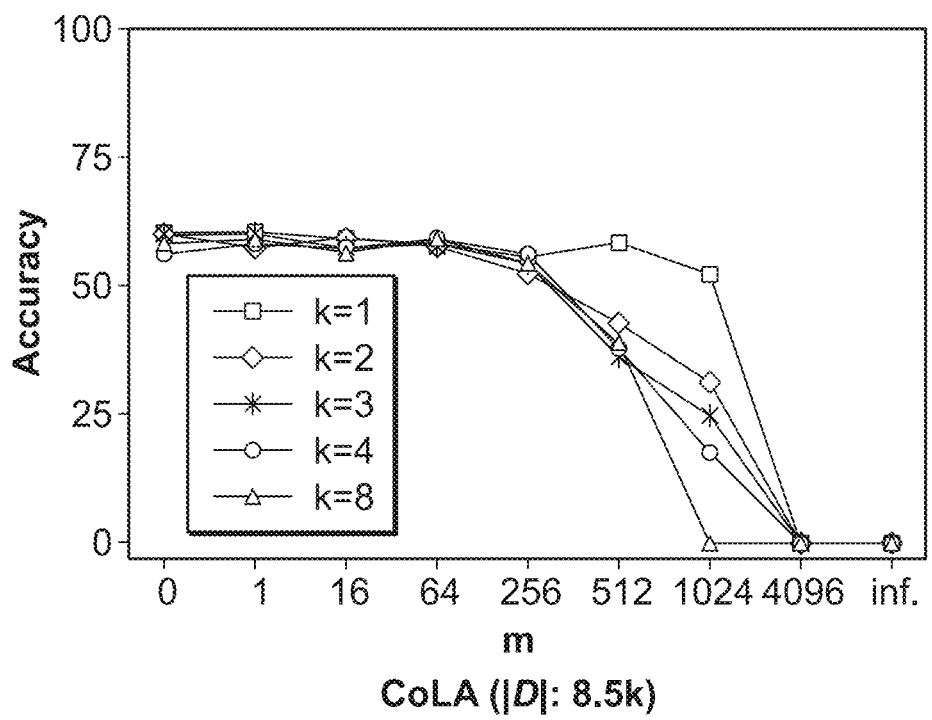
Figure 17E:
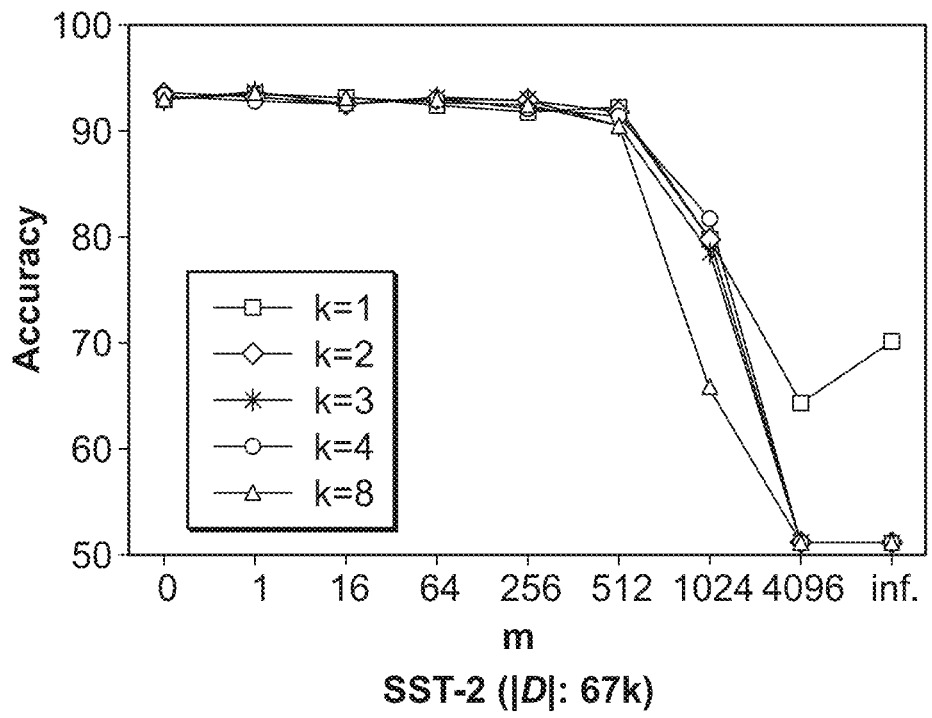
Figure 17F:
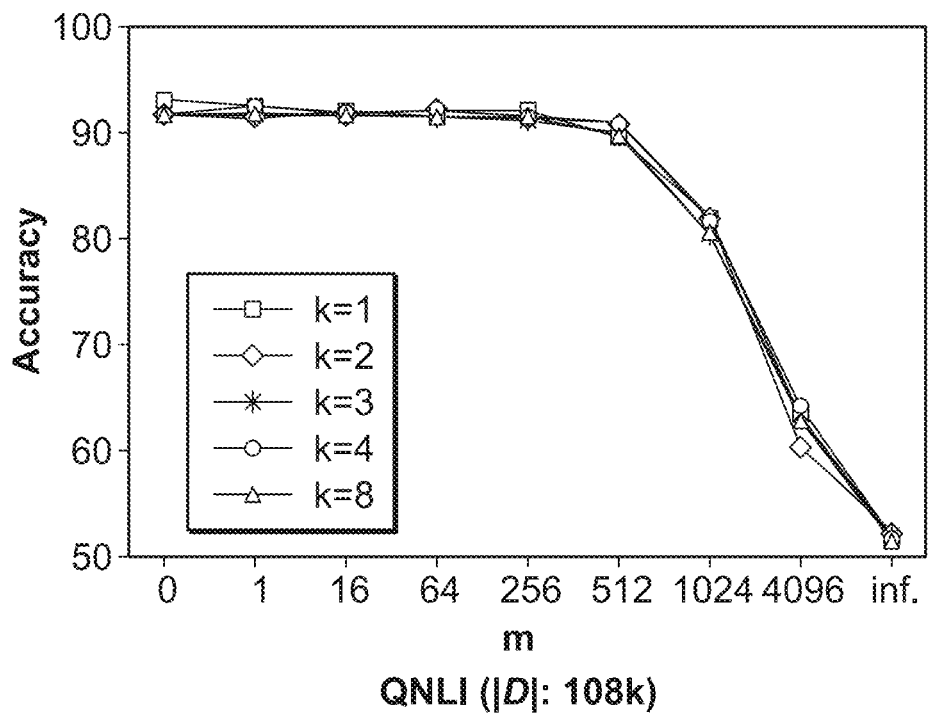
Figure 17G:
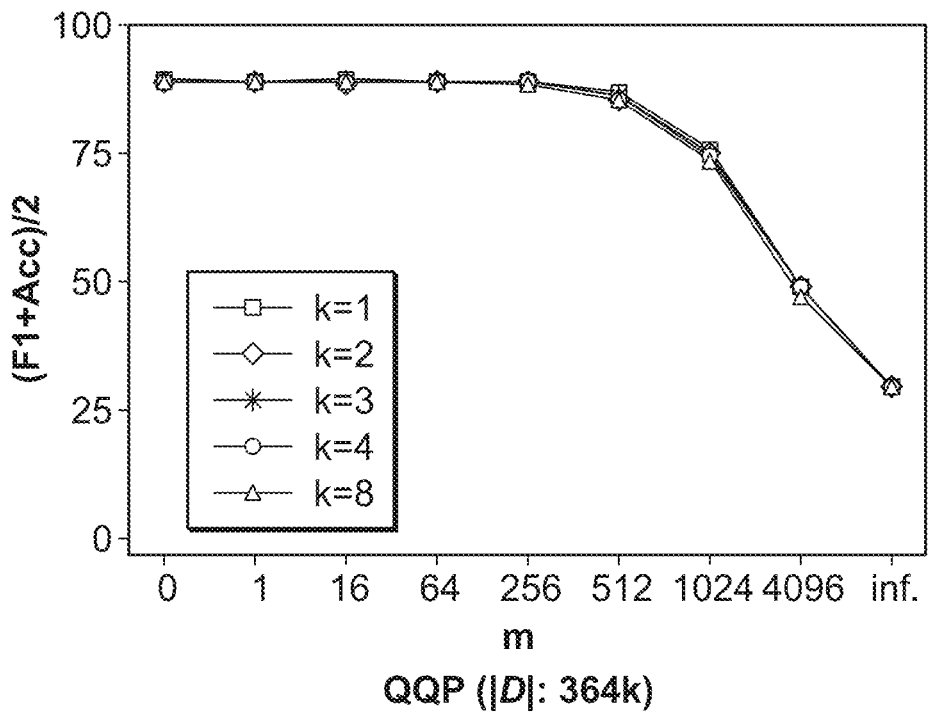
Figure 17H:
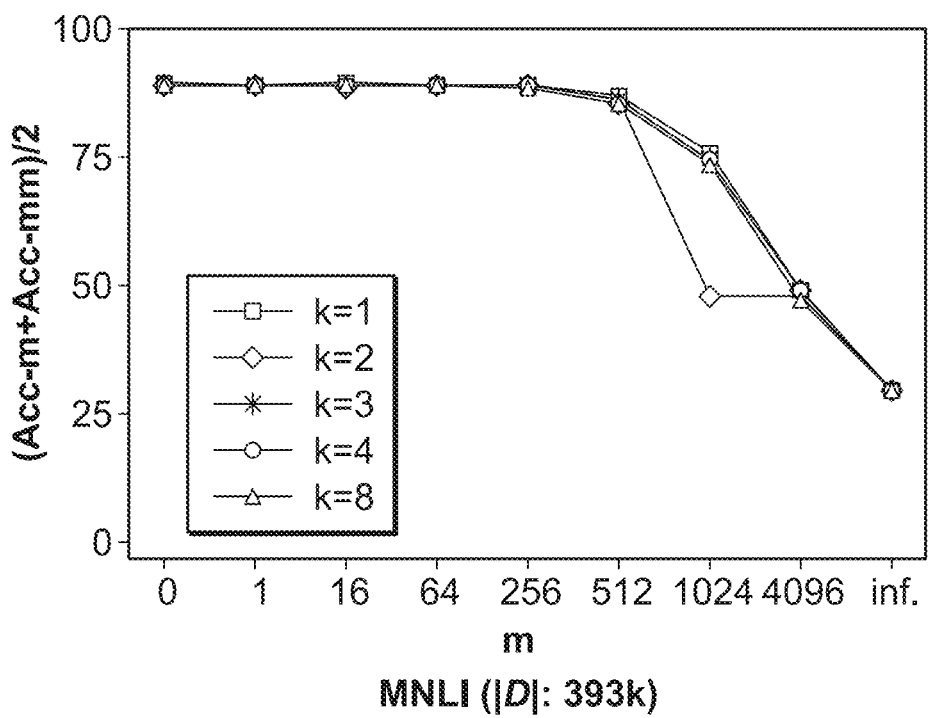

Fine-tuning BERT with TextHide: In a federated learning scenario, multiple participants holding private text data may wish to solve NLP tasks by using a BERT-style fine-tuning pipeline, where TextHide, a simple InstaHide-inspired encryption step can be applied at its intermediate level to ensure privacy. This is illustrated in FIG. 13.

The BERT fine-tuning framework assumes (input, label) pairs (x,y)'s, where x takes the form of [CLS]$s_1$ [SEP] for single-sentence tasks, or [CLS]$s_1$ [SEP]$s_2$ [SEP] for sentence-pair tasks. y is a one-hot vector for classification tasks, or a real-valued number for regression tasks. For a standard fine-tuning process, federated learning participants use a BERT-style model $f_{\theta_1}$ to compute hidden representations $f_{\theta_1}(x)$'s for their inputs x's and then train a shallow classifier $h_{\theta_2}$, on $f_{\theta_1}(x)$, while also fine-tuning $\theta_1$. The parameter vectors $\theta_1$, $\theta_2$ will be updated at the central server via pooled gradients. All participants hold current copies of the two models.

To ensure privacy of their individual inputs x's, federated learning participants can apply TextHide encryption at the output $f_{\theta_1}(x)$'s. The model $h_{\theta_2}$ will be trained on these encrypted representations. Each participant will compute gradients by backpropagating through their private encryption, and this is going to be the source of the secrecy: the attacker can see the communicated gradients but not the secret encryptions, which limits leakage of information about the input.

Two TextHide schemes are formally described for fine-tuning BERT in the federated learning setting: TextHide$_{intra}$ which encrypts an input using other examples from the same dataset, and TextHide$_{inter}$ which utilizes a large public dataset to perform encryption. Due to a large public dataset, TextHide$_{inter}$ is more secure than TextHide$_{intra}$ but the latter is quite secure in practice when the training set is large.

Basic TextHide—Intra-Dataset TextHide: In TextHide, there is a pre-trained text encoder $f_{\theta_1}$, which takes x, a sentence or a sentence pair, and maps it to a representation $e=f_{\theta_1}(x) \in R^d$ (e.g., d=768 for BERT$_{base}$). [b] is used to denote the set $\{1, 2, \ldots, b\}$. Given a dataset D, the set $\{x_i, y_i\}_{i \in [b]}$ is denoted an input batch by B, where $x_1, \ldots, x_b$ are b inputs randomly drawn from D, and $y_1, \ldots, y_b$ are their labels. For each $x_i$ in the batch B, $i \in [b]$, $x_i$ can be encoded using $f_{\theta_1}$, and a new set of $\{e_i=f_{\theta_1}(x_i), y_i\}_{i \in [b]}$ can be obtained. This set is referred to as an "encoding batch" and is denoted by E.

$\sigma \in \{-1,+1\}^d$ is used to denote an entry wise sign flipping mask. For a TextHide scheme, $M=\{\sigma_1, \ldots, \sigma_m\}$ denotes its randomly pre-generated mask pool of size m, and k denotes the number of sentences combined in a TextHide representation. Such as parametrized scheme is named as (m,k)-TextHide.

The algorithm in FIG. 14 describes how (m,k)-TextHide encrypts an encoding batch $E=\{e_i,y_i\}_{i \in [b]}$ into a hidden batch $\tilde{E}=\{\tilde{e}_i, y_i\}_{i \in [b]}$, where b is the batch size. For each $e_i$ in E, TextHide linearly combines it with k-1 other representations, as well as their labels. Then, TextHide randomly selects a mask $\sigma_i$ from M, the mask pool, and applies it on the combination using coordinate-wise multiplication. This gives $\tilde{e}_i$, the encryption of $e_i$ (shown in lines 12,13 of FIG. 14). Note that different $e_i$'s in the batch get assigned to fresh random $\sigma_i$'s from the pool.

Plug into federated BERT fine-tuning: The algorithm in FIG. 15 shows how to incorporate (m,k)-TextHide in federated learning, to allow a centralized server and C distributed clients to collaboratively fine-tune a language model (e.g., BERT) for any downstream tasks, without sharing raw data. Each client (indexed by c) holds its own private data $D_c$ and a private mask pool $M_c$, and $\Sigma_{c=1}^C |M_c|=m$.

The procedure takes a pre-trained BERT $f_{\theta_1}$ and an initialized task-specific classifier $h_{\theta_2}$, and runs T steps of global updates of both $\theta_1$ and $\theta_2$. In each global update, the server aggregates local updates of C clients. For a local update at client c, the client receives the latest copy of $f_{\theta_1}$ and $h_{\theta_2}$ from the server, samples a random input batch $\{x_i, y_i\}_{i \in [b]}$ from its private dataset $D_c$, and encodes it into an encoding batch $E=\{e_i=f_{\theta_1}(x_i),y_i\}_{i \in [b]}$ (shown at line 21 in FIG. 15).

To protect privacy, each client will run ((m,k)-TextHide with its own mask pool $M_c$ to encrypt the encoding batch E into a hidden batch $\tilde{E}$ (shown at line 22 in FIG. 15). The client then uses the hidden batch $\tilde{E}$ to calculate the model updates (i.e., gradients) of both the BERT encoder $f_{\theta_1}$ and the shallow classifier $h_{\theta_2}$, and returns them to the server (line 23 in FIG. 15). The server averages all updates from C clients, and runs a global update for $f_{\theta_1}$ and $h_{\theta_2}$ (lines 12, 13 in FIG. 15).

Inter-dataset TextHide: Inter-dataset TextHide encrypts private inputs with text data from a second dataset, which can be a large public corpus (e.g., Wikipedia). The large public corpus plays a role reminiscent of the random oracle in cryptographic schemes.

Assume there is a private dataset $D_{private}$ and a large public dataset $D_{public}$. TextHide$_{inter}$ randomly chooses $\lceil k/2 \rceil$ sentences from $D_{private}$ and the other $\lfloor k/2 \rfloor$ from $D_{public}$, mixes their representations, and applies on it a random mask from the pool. A main difference between TextHide$_{inter}$ and TextHide$_{intra}$ is, TextHide$_{intra}$ mixes all labels of inputs used in the combination, while in TextHide$_{inter}$, only the labels from $D_{private}$ will be mixed (there is usually no label from the public dataset). Specifically, for an original datapoint $\{x_i,y_i\} \in E$, let $S \subset [b]$ denote the set of data points' indices that its TextHide encryption combines, and $|S|=k$. Then its TextHide$_{inter}$ label is given by FIG. 15: where 1[f] is a variable that 1[f]=1 if f holds, and =0 otherwise. For each $j \in [k]$, $\pi_j: [b] \to [b]$ is a permutation.

Security of TextHide: The encrypted representations produced by TextHide themselves are secure—i.e., do not allow any efficient way to recover the text x—from the security framework of InstaHide. However, an additional source of information leakage is the shared gradients during federated learning. This is mitigated by ensuring that the secret mask a used to encrypt the representation of input x is changed each epoch. The pool of masks is usually much larger than the number of epochs, which means that each mask gets used only once for an input (with negligible failure probability). The gradient inversion attack cannot work in this scenario. In the following section, it will be shown that it does not even work with a fixed mask.

Experiments

The utility and privacy of TextHide is evaluated in experiments, with an aim to answer the following questions:
(1) What is the accuracy when using TextHide for sentence-level natural language understanding tasks?
(2) How effective is TextHide in terms of hiding the gradients and the representations of the original input?

Experimental Setup Dataset: TextHide is evaluated on the General Language Understanding Evaluation (GLUE) benchmark, a collection of 9 sentence-level language understanding tasks: (1) Two sentence-level classification tasks including Corpus of Linguistic Acceptability (CoLA), and Stanford Sentiment Treebank (SST-2); (2) Three sentence-pair similarity tasks including Microsoft Research Paraphrase Corpus (MRPC), Semantic Textual Similarity Benchmark (STSB), and Quora Question Pairs (QQP); (3) Three natural language inference (NLI) tasks including Multi NLI (MNLI), Question NLI (QNLI), and Recognizing Textual Entailment (RTE). The table in FIG. 16 summarizes the data size, tasks, and evaluation metrics of all the datasets. All tasks are single-sentence or sentence-pair classification tasks except that STS-B is a regression task.

Implementation: A pre-trained cased BERT$_{base}$ model is fine-tuned on each dataset. It is noticed that generalizing to different masks requires a more expressive classifier, thus instead of adding a linear classifier on top of the [CLS] token, a multilayer perceptron of hidden-layer size (768, 768, 768) is used to get better performance under TextHide. AdamW, a widely used optimizer in NLP tasks is used as the optimizer, and a linear scheduler is used with a warmup ratio of 0.1.

Accuracy Results of TextHide: To answer the first question, the accuracy of TextHide is compared to the BERT baseline without any encryption. The TextHide scheme is varied as follows: (1) Evaluate different (m, k) combinations, where m (the size of mask pool) is chosen from $\{0,1,16,64,256,512,1024,4096,\infty\}$, and k (the number of inputs to combine) is chosen from {1,2,3,4,8}. (m, k)=(0, 1) is equivalent to the baseline; and (2) Test both TextHide$_{intra}$ and TextHide$_{inter}$. A MNLI train set (around 393k examples and all the labels are removed) is used as the "public dataset" in the inter-dataset setting and BERT fine-tuning is run with TextHide$_{inter}$ on the other 7 datasets. Here MNLI is used simply for convenience as it is the largest dataset in GLUE and one can use any public corpora (e.g., Wikipedia) in principle.

FIG. 17(a)-(h) show the performance of TextHide$_{intra}$ parameterized with different (m, k)'s. When m is fixed, the network performs consistently with different k's, suggesting that Mixup also works for language understanding tasks.

Increasing m makes learning harder since the network needs to generalize to different masking patterns. However, for most datasets (except for RTE), TextHide with m=256 only reduces accuracy slightly comparable to the baseline. The explanation for the poor performance on RTE is that training on this small dataset (even without encryption) to be quite unstable. This has been observed in prior work before. In general, TextHide can work with larger m (better security) when the training corpus is larger (e.g., m=512 for data size >100k).

TextHide$_{intra}$ mixes the representations from the same private dataset, whereas TextHide$_{inter}$ combines representations of private inputs with representations of random inputs from a large public corpus (MNLI here). The table in FIG. 16 shows the results of the baseline and TextHide (both TextHide$_{intra}$ and TextHide$_{inter}$) on the GLUE benchmark, with (m, k)=(256,4) except for RTE with (m, k)=(16, 4). The averaged accuracy reduction of TextHide$_{intra}$ is 1.9%, when compared to the baseline model. With the same (m, k), TextHide$_{inter}$ incurs an additional 2.5% accuracy loss on average, but as previously suggested, the large public corpus gives a stronger notion of security.

Security of Gradients in TextHide: TextHide is tested against the gradients matching attack in federated learning, which has been shown effective in recovering private inputs from public gradients.

Given a public model and the gradients generated by private data from a client, the attacker aims to recover the private data: he starts with some randomly initialized dummy data and dummy labels (i.e., a dummy batch). In each iteration of attack, he calculates the $l_2$-distance between gradients generated by the dummy batch and the real gradients, and backpropagates that loss to update the dummy batch. The original attack is infeasible in the TextHide setting, because the attacker cannot backpropagate the loss of the dummy batch through the secret mask of each client. Thus, the attack is enhanced here by allowing the attacker to learn the mask: at the beginning of the attack, he also generates some dummy masks and back-propagates the loss of gradient to update them.

The adapted code for text data is used for evaluation. The success rate is used as the metric: an attack is said to be successful if the mean squared error between the original input and the samples recovered from gradients is ≤0.001. Two key variables are varied in the evaluation: k and d, where d is the dimensionality of the representation (768 for BERT$_{base}$).

The attack is run in a much easier setting for the attacker to test the upper bound of privacy leakage: (1) The TextHide scheme uses a single mask throughout training (i.e., m=1); (2) The batch size is 1; and (3) The attacker knows the true label for each private input.

Figure 19A:
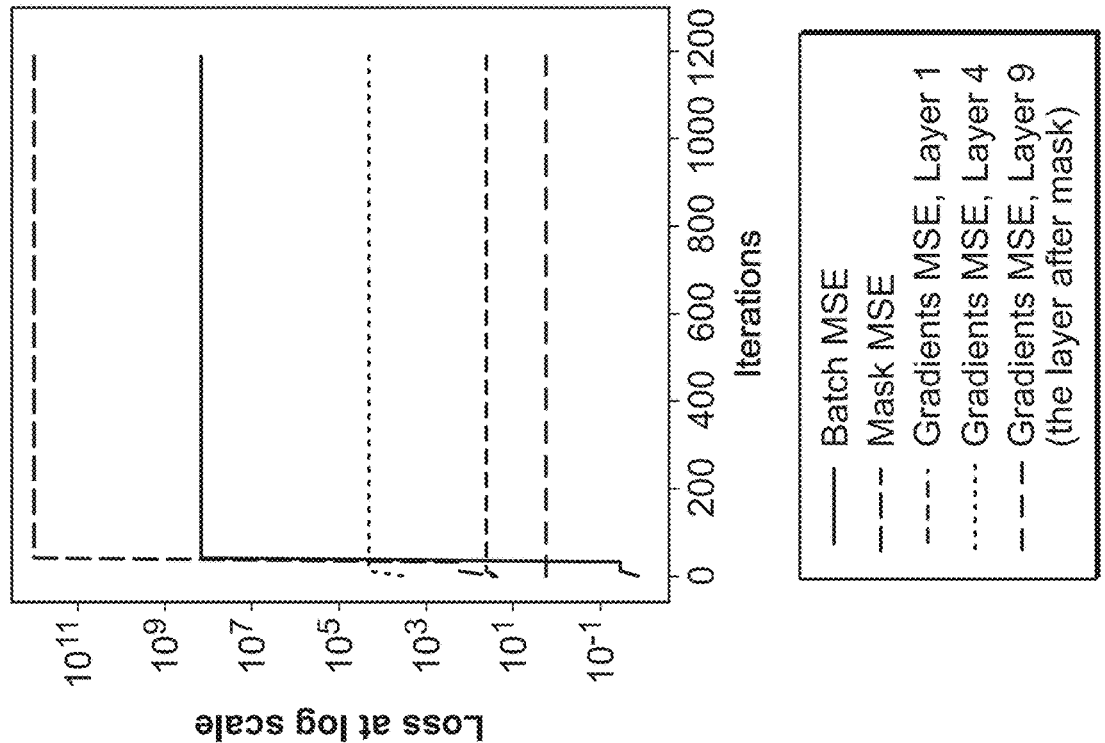
FIG. 19(a) depicts loss over iterations of a succeeded attack according to an embodiment of the present invention.
Figure 19B:
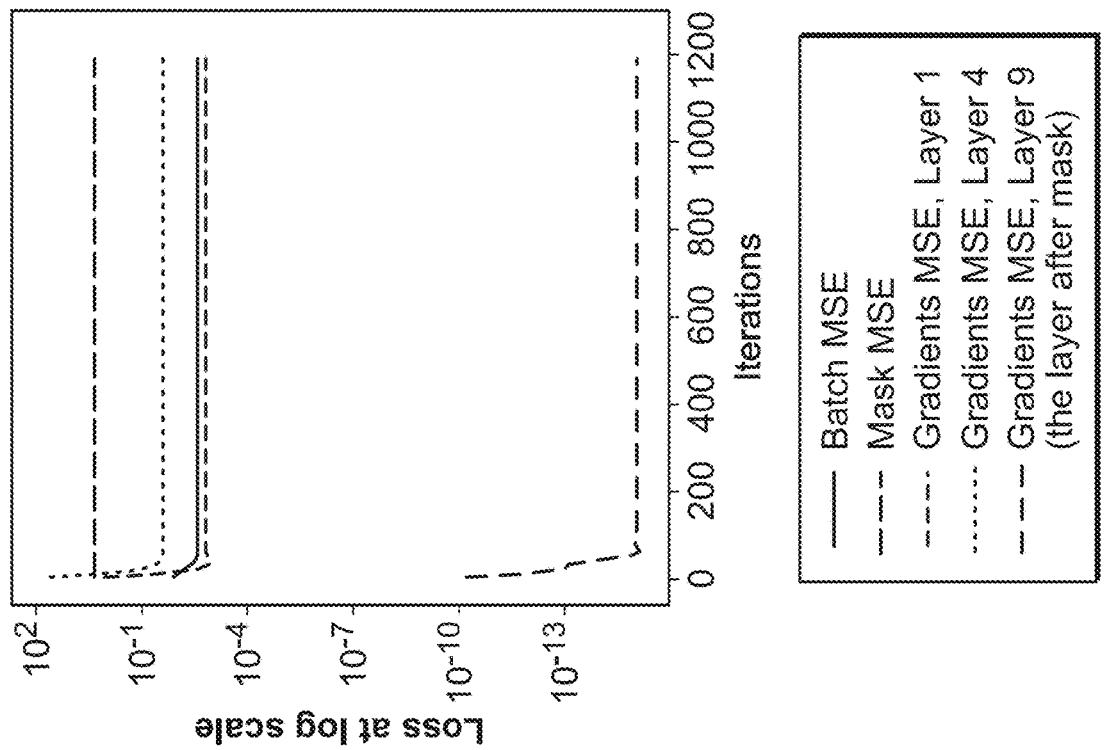
FIG. 19(b) depicts loss over iterations of a failed attack according to an embodiment of the present invention.

As shown in the table in FIG. 18, increasing d greatly increases the difficulty of attack—for no mixing (k=1), a representation with d=1024 reduces the success rate of 82% (baseline) to only 8%. The defense becomes much stronger when combined with mixing: a small mask of 4 entries combined with k=2 makes the attack infeasible in the tested setting. FIG. 19 suggests that the success of this attack largely depends on whether the mask is successfully matched, which is aligned with the security argument of TextHide.

Effectiveness of Hiding Representations: An attack-based evaluation is also designed to test whether TextHide representations effectively "hide" its original representations, i.e., how 'different' the TextHide representation is from its original representation. Given a corpus of size n, a search index $(\{x_i, e_i\}_{i=1}^{n}$, where $x_i$ is the i-th example in the training corpus, $e_i$ is $x_i$'s encoded representation $f_{\theta_i}$), and a query $\tilde{e}$ (TextHide representation of any input x in the corpus), RSS returns $x_v$ from the index such that $v=\arg\min_{i\in[n]} \cos(e_i, \tilde{e})$. If $x_v$ is dramatically different from x, then $\tilde{e}$ hides e (the original representation of x) effectively. To build the search index, all $\{x_i, e_i\}$ pairs of a corpus are dumped by extracting each sentence's [CLS] token from the baseline BERT model. Facebook's FAISS library is used for efficient similarity search to implement RSS.

The evaluation requires measuring the similarity of a sentence pair, (x, x*), where x is a sample in corpus, and x* is RSS's answer given x's encoding "e" as query. The evaluation uses three explicit leakage metrics: (1) Identity: 1 if x* is identical to x, else 0; (2) JC$_{dist}$: Jaccard distance |words in x∩word in x*|/|words in x∪words in x*|; and (3) TF-IDF$_{sim}$: cosine similarity between x's and x*'s TF-IDF representation in the corpus. The evaluation also uses two implicit (semantic) leakage metrics: (1) Label: 1 if x*, x have the same label, else 0; and (2) SBERT$_{sim}$: cosine similarity between x's and x*'s SBERT representations pretrained on NLI-STS. For all five metrics above, a larger value indicates a higher similarity between x and x*, i.e., worse 'hiding'.

For an easier demonstration, RSS is run on two single-sentence datasets CoLA and SST-2 with TextHide$_{intra}$. The results presumably can generalize to larger datasets and TextHide$_{inter}$, since attacking a small corpus with a weaker security is often easier than attacking a larger one with a stronger security. For each task, three (m, k) variants are tested: baseline (m=0, k=1), mix-only (m=0, k=4), and TextHide (m=256, k=4). A random baseline for reference is reported—for each query, the attacker returns an input randomly selected from the index.

The result with original representation as query can be viewed as an upper bound of privacy leakage where no defense has been taken. As shown in the tables in FIGS. 20 and 21, RSS almost returns the correct answer all the time (i.e., Identity close to 1), which is a severe explicit leakage. Mix-only representation greatly reduces both explicit leakage (i.e., gives much lower similarity on all first 3 metrics) compared to the undefended baseline. However, RSS still can query back the original sentence with Mix-only representations (see Query 1 in FIG. 21). Also, semantic leakage, measured by Label and SBERT$_{sim}$, is higher than the random baseline.

TextHide works well in protecting both explicit and semantic information: sample attacks on TextHide (see FIG. 21) return sentences seemingly irrelevant to the original sentence hidden in the query representation. Note that the sophisticated attacker (RSS) against TextHide gives similar performance to a naive random guessing attacker.

System Overview

Figure 22:
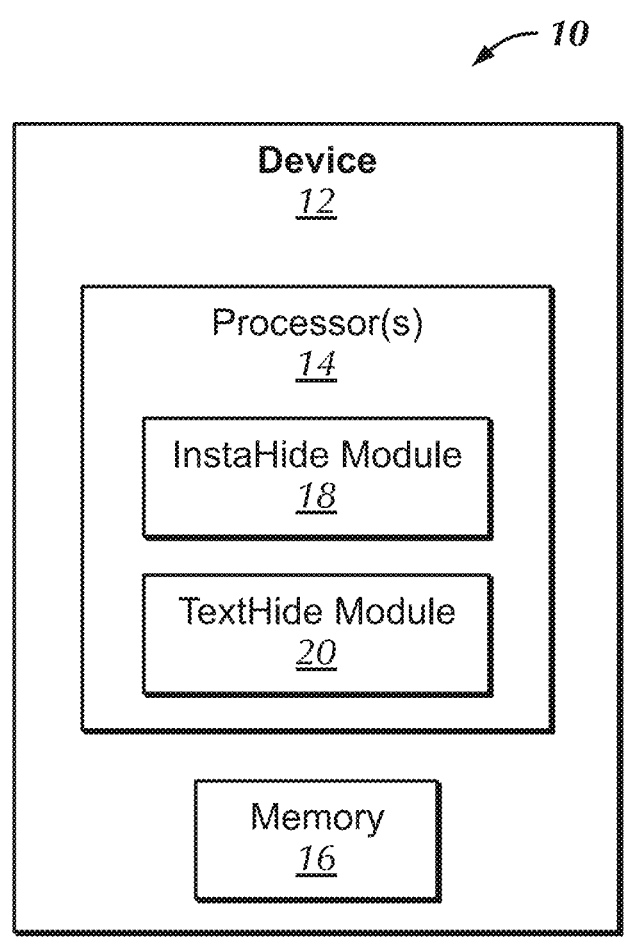
FIG. 22 depicts a block diagram of a system for implementing InstaHide and/or TextHide according to an embodiment of the present invention.

FIG. 22 illustrates a system 10 configured to implement the encryption operations of InstaHide and TextHide described above. The system 10 includes a device 12, which may be implemented in a variety of configurations including general computing devices such as but not limited to desktop computers, laptop computers, and network appliances or mobile and edge devices such as but not limited to mobile phones, smart phones, smart watches, tablet computers, smart home devices, and self-driving cars. The variety of configurations may include a central processing unit (CPU), a graphics processing unit (GPU), or an application-specific integrated circuit (ASIC), as nonlimiting examples. The device 12 includes one or more processors 14 for performing specific functions and memory 16 for storing those functions. The processors 14 include at least one of an InstaHide module 18 and a TextHide module 20 for implementing the encryption operations specifically described above.

CONCLUSION

As such, generally disclosed herein are InstaHide schemes introduced as a practical way to do instance hiding for private distributed learning. By contrast, traditional methods in cryptography use finite field arithmetic and involve inefficient protocols. (OK for password protection or e-cash; not so much for large scale deep learning.) InstaHide involves new variants of the Mixup technique that are shown to balance utility and security.

Further generally disclosed herein are TextHide approaches for privacy-preserving NLP training with a pre-train and fine-tuning framework in a federated learning setting. It requires all participants to add a simple encryption step with a one-time secret key. It imposes a slight burden in terms of computation cost and accuracy. Attackers who wish to break such encryption and recover user inputs have to pay a large computational cost.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A method for encrypting image data for a neural network, the method comprising:
   mixing the image data with other datapoints to form mixed data; and
   applying a pixel-wise random mask to the mixed data to form encrypted data, where applying the pixel-wise random mask includes (i) allotting each training datapoint a one-time pixel-wise random mask that flips a sign of each pixel in the mixed data with probability ½, and (ii) performing element-wise multiplication between the mixed data and the one-time pixel-wise random mask.

2. The method of claim 1, wherein mixing the image data further comprises constructing datapoints by randomly picking datapoints from a training dataset and combining them using random coefficients.

3. The method of claim 1, wherein mixing the image data further comprises mixing the image data with datapoints from other datasets.

4. The method of claim 3, wherein the datapoints from other datasets are chosen randomly from public datasets.

5. The method of claim 1, further comprising transferring the encrypted data from at least one of a low-power and low-cost device to a central server.

6. The method of claim 1, further comprising training the neural network using the encrypted data and corresponding mixed labels.

7. The method of claim 6, wherein training the neural network using the encrypted data and the corresponding mixed labels further comprises training the neural network to learn a mapping between encrypted images and their corresponding mixed labels.

8. The method of claim 6, wherein training the neural network further comprises training using Federated learning protocols at a central server.

9. A system for encrypting image data for a neural network, the system comprising:
   a memory; and
   at least one processor configured to:
      mix the image data with other datapoints to form mixed data; and
      apply a pixel-wise random mask to the mixed data to form encrypted data by: (i) applying the pixel-wise random mask by allotting each training datapoint a one-time pixel-wise random mask that flips a sign of each pixel in the mixed data with probability 1/2, and (ii) performing element-wise multiplication between the mixed data and the one-time pixel-wise random mask.

10. The system of claim 9, wherein the processor is further configured to construct datapoints by randomly picking datapoints from a training dataset and combine them using random coefficients.

11. The system of claim 9, wherein the processor is further configured to mix the image data by mixing the image data with datapoints from other datasets.

12. The system of claim 11, wherein the datapoints from other datasets are chosen randomly from public datasets.

13. The system of claim 9, wherein the processor is further configured to transfer the encrypted data to a central server.

14. The system of claim 13, wherein the central server comprises at least one processor configured to train the neural network using the encrypted data and corresponding mixed labels.

15. The system of claim 13, wherein the central server processor is further configured to train the neural network using the encrypted data and the corresponding mixed labels by training the neural network to learn a mapping between encrypted images and their corresponding mixed labels.

16. The system of claim 13, wherein the central server processor is further configured to train the neural network by training using Federated learning protocols.

* * * * *